US012394568B2

(12) United States Patent
Umegaki et al.

(10) Patent No.: US 12,394,568 B2
(45) Date of Patent: Aug. 19, 2025

(54) MULTILAYER CERAMIC CAPACITORS AND CIRCUIT BOARDS

(71) Applicant: TAIYO YUDEN CO., LTD., Tokyo (JP)

(72) Inventors: Kaoru Umegaki, Tokyo (JP); Hirotaka Ohno, Tokyo (JP); Riki Suemasa, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 145 days.

(21) Appl. No.: 18/158,231

(22) Filed: Jan. 23, 2023

(65) Prior Publication Data

US 2023/0282419 A1    Sep. 7, 2023

(30) Foreign Application Priority Data

Jan. 31, 2022  (JP) .................................. 2022-012561

(51) Int. Cl.
*H01G 4/012* (2006.01)
*H01G 2/06* (2006.01)
*H01G 4/30* (2006.01)
*H01G 4/35* (2006.01)

(52) U.S. Cl.
CPC ............... *H01G 4/012* (2013.01); *H01G 2/06* (2013.01); *H01G 4/30* (2013.01); *H01G 4/35* (2013.01)

(58) Field of Classification Search
None
See application file for complete search history.

(56) References Cited

U.S. PATENT DOCUMENTS

| | | | | |
|---|---|---|---|---|
| 5,450,278 A | * | 9/1995 | Lee ........................ | H01G 4/30 361/306.3 |
| 2004/0184202 A1 | * | 9/2004 | Togashi ................... | H01G 4/30 361/15 |
| 2017/0316882 A1 | | 11/2017 | Park et al. | |
| 2018/0105936 A1 | | 4/2018 | Nagano | |
| 2019/0148073 A1 | * | 5/2019 | Lee ........................ | H01G 4/008 361/306.3 |
| 2020/0343051 A1 | * | 10/2020 | Kirk ...................... | H01C 7/1006 |
| 2022/0165494 A1 | * | 5/2022 | Kim ........................ | H01G 4/008 |
| 2022/0165499 A1 | * | 5/2022 | Kim ........................ | H01G 4/232 |

FOREIGN PATENT DOCUMENTS

| | | | | |
|---|---|---|---|---|
| JP | 2010177717 A | * | 8/2010 | ............... H01G 4/35 |
| JP | 2017-199895 A | | 11/2017 | |
| JP | 2018-67582 A | | 4/2018 | |

* cited by examiner

*Primary Examiner* — Eric W Thomas
(74) *Attorney, Agent, or Firm* — CHEN YOSHIMURA LLP

(57) ABSTRACT

A multilayer ceramic capacitor includes a ceramic body including a first internal electrode and a second internal electrode facing the first internal electrode, a pair of first external electrodes arranged on end surfaces of the ceramic body, respectively, connected to the first internal electrode; and a pair of second external electrodes arranged on side surfaces of the ceramic body, respectively, connected to the second internal electrode, wherein at least one of a first electrode main body portion and a second electrode main body portion has a first current regulating portion that is a cutout portion spaced apart from an outer edge of the corresponding first or second electrode main body portion and having a shape in which a ratio of a maximum longitudinal dimension to a maximum transverse dimension is greater than 1.

19 Claims, 24 Drawing Sheets

MULTILAYER CERAMIC CAPACITORS AND CIRCUIT BOARDS

BACKGROUND OF THE INVENTION

Technical Field

The present invention relates to a so-called three-terminal type multilayer ceramic capacitor and a circuit board mounting the same.

Background Art

Multilayer ceramic capacitors as described in Patent Documents 1 and 2 are known. These multilayer ceramic capacitors are also called a three-terminal type, in that in addition to a pair of external electrodes provided at both ends in the longitudinal direction, external electrodes are also formed on the side surfaces. A three-terminal type multilayer ceramic capacitor can generally shorten the distance between external electrodes having different polarities, and can connect side external electrodes, which are ground electrodes, in parallel. As a result, the three-terminal type multilayer ceramic capacitor can reduce the equivalent series inductance (ESL) and is used for purposes such as noise removal in a high frequency band.

RELATED ART DOCUMENT

Patent Document

Patent Document 1: Japanese Patent Application Laid-Open Publication No. JP-A-2017-199895
Patent Document 2: Japanese Patent Application Laid-Open Publication No. JP-A-2018-67582

SUMMARY OF THE INVENTION

In recent years, as electronic devices have become more sophisticated, the frequency of AC voltage applied to multilayer ceramic capacitors tends to increase. Therefore, there is a demand for a terminal-type multilayer ceramic capacitor capable of stably reducing ESL even in a high frequency band.

In view of the circumstances as described above, an object of the present invention is to provide a multilayer ceramic capacitor and a circuit board capable of reducing ESL.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a multilayer ceramic capacitor, comprising: a ceramic body having a pair of end surfaces perpendicular to a first axis and a pair of side surfaces perpendicular to a second axis that is orthogonal to the first axis, the ceramic body including: a first internal electrode having a first electrode main body portion and a pair of first lead-out portions led out from the first electrode main body portion to the pair of end surfaces, respectively; and a second internal electrode having a second electrode main body portion and a pair of second lead-out portions led out from the second electrode main body portion to the pair of side surfaces, respectively, the second internal electrode facing the first internal electrode in a direction of a third axis that is orthogonal to the first and second axes; a pair of first external electrodes arranged on the pair of end surfaces, respectively, and connected to the pair of first lead-out portions of the first internal electrode; and a pair of second external electrodes arranged on the pair of side surfaces, respectively, and connected to the pair of second lead-out portions of the second internal electrode, wherein at least one of the first electrode main body portion of the first internal electrode and the second electrode main body portion of the second internal electrode has a first current regulating portion that is a cutout portion spaced apart from an outer edge of the corresponding first or second electrode main body portion and having a shape in which a ratio of a maximum longitudinal dimension to a maximum transverse dimension is greater than 1.

With the above configuration, the current generated in the electrode main body portion easily passes through the region other than the first current regulating portion. As a result, current is more likely to be guided between the outer edge portion and the first current regulating portion, and the current density in the vicinity of the outer edge portion is more likely to increase. As a result, the current path length can be shortened, and the ESL can be reduced.

The first current regulating portion may have a dimension along the first axis greater than a dimension along the second axis thereof.

Thereby, in the electrode main body portion that can be elongated in the first axial direction, the current guiding effect by the first current regulating portion can be enhanced.

The first current regulating portion may be formed obliquely with respect to the first axis and the second axis. Thereby, the distance between one end of the first current regulating portion and the outer edge can be narrowed, and the current density in the vicinity of the outer edge can be further increased.

The first current regulating portion may be positioned so as to cross a virtual boundary line extending along the second axis in a plan view as seen in a direction of the third axis, the virtual boundary line dividing an outer region of the first electrode main body portion into equal halves in the plan view, the outer region being defined as a region in the first electrode main body portion that is located, in the plan view, on an outer side of a virtual line that is extending along the second axis from a side edge, along the first axis, of the second lead-out portion of the second internal electrode.

As a result, ESL can be reduced more reliably.

The first current regulating portion may be provided in one of quadrants of the at least one of the first electrode main body portion of the first internal electrode and the second electrode main body portion of the second internal electrode, the quadrants being defined as four regions of the corresponding first or second electrode main body portion divided by a first center line extending in a direction of the first axis dividing the corresponding first or second electrode main body portion into equal halves and by a second center line extending in a direction of the second axis dividing the corresponding first or second electrode main body portion into equal halves.

Alternatively, the first current regulating portion may be formed so as to cross at least two of quadrants. Also, the first current regulating portion may be formed along the first or second center line in a plan view.

The at least one of the first electrode main body portion of the first internal electrode and the second electrode main body portion of the second internal electrode may further have a second current regulating portion that is a cutout portion spaced apart from an outer edge of the corresponding first or second electrode main body portion and having a shape in which a ratio of a maximum longitudinal dimension to a maximum transverse dimension is greater than 1.

With this configuration, the current density distribution in the electrode main body portion can be more effectively adjusted by the first and second current regulating portions.

The first current regulating portion and the second current regulating portion may be formed line-symmetrically with respect to a virtual straight line extending in a direction of the first axis and passing through the first lead-out portion or a virtual straight line extending in a direction of the second axis and passing through the second lead-out portion in a plan view.

Thereby, the first current regulating section and the second current regulating section can more effectively act on the current that can be distributed line-symmetrically.

Further, the first current regulating portion and the second current regulating portion may intersect with each other.

The at least one of the first electrode main body portion of the first internal electrode and the second electrode main body portion of the second internal electrode may further have a third current regulating portion and a fourth current regulating portion, each of the third and fourth current regulating portions being a cutout portion spaced apart from an outer edge of the corresponding first or second electrode main body portion and having a shape in which a ratio of a maximum longitudinal dimension to a maximum transverse dimension is greater than 1.

The current density distribution in the electrode main body can be more effectively adjusted by the four current regulating portions. In addition, by dividing the current regulating section into four sections, it is possible to suppress a decrease in the effective electrode area.

The first current regulating portion may be provided in a first quadrant among quadrants of the at least one of the first electrode main body portion of the first internal electrode and the second electrode main body portion of the second internal electrode, the second current regulating portion may be provided in a second quadrant among the quadrants, the third current regulating portion may be provided in a third quadrant among the quadrants, and the fourth current regulating portion may be provided in a fourth quadrant among the quadrants, the quadrants being defined as four regions of the corresponding first or second electrode main body portion divided by a first center line extending in a direction of the first axis dividing the corresponding first or second electrode main body portion into equal halves and by a second center line extending in a direction of the second axis dividing the corresponding first or second electrode main body portion into equal halves.

Also, the third current regulating portion and the fourth current regulating portion may be formed line-symmetrically with respect to a virtual straight line extending in a direction of the first axis and passing through the first lead-out portion or a virtual straight line extending in a direction of the second axis and passing through the second lead-out portion in a plan view. Furthermore, the first current regulating portion and the second current regulating portion may be formed line-symmetrically with respect to one of the first center line and the second center line, and the third current regulating portion and the fourth current regulating portion may be formed line-symmetrically with respect to said one of the first center line and the second center line.

This allows the four current regulating sections to act more effectively on the current that can be distributed line-symmetrically.

Further, the first, second, third, and the fourth current regulating portions may be formed so as to radially extend respectively from an inner side to an outer side along directions of the first and second axes.

Thereby, the current can be guided from the inner side to the outer side in the first axial direction and the second axial direction, and the current density at the outer edge can be more effectively increased.

The first current regulating portion may be configured as a cutout portion that does not substantially have electrode material.

Also, the second current regulating portion, the third current regulating portion, and the fourth current regulating portion may be configured as cutout portions that do not substantially have electrode material.

Thus, by adjusting the electrode pattern, it is possible to form a current regulating portion that can effectively regulate the current.

In another aspect, the present disclosure provides a circuit board, comprising: a multilayer ceramic capacitor; and a substrate body mounting the multilayer ceramic capacitor thereon, wherein the multilayer ceramic capacitor includes: a ceramic body having a pair of end surfaces perpendicular to a first axis and a pair of side surfaces perpendicular to a second axis that is orthogonal to the first axis, the ceramic body including: a first internal electrode having a first electrode main body portion and a pair of first lead-out portions led out from the first electrode main body portion to the pair of end surfaces, respectively; and a second internal electrode having a second electrode main body portion and a pair of second lead-out portions led out from the second electrode main body portion to the pair of side surfaces, respectively, the second internal electrode facing the first internal electrode in a direction of a third axis that is orthogonal to the first and second axes; a pair of first external electrodes arranged on the pair of end surfaces, respectively, and connected to the pair of first lead-out portions of the first internal electrode; and a pair of second external electrodes arranged on the pair of side surfaces, respectively, and connected to the pair of second lead-out portions of the second internal electrode, wherein at least one of the first electrode main body portion of the first internal electrode and the second electrode main body portion of the second internal electrode has a first current regulating portion that is a cutout portion spaced apart from an outer edge of the corresponding first or second electrode main body portion and having a shape in which a ratio of a maximum longitudinal dimension to a maximum transverse dimension is greater than 1.

As described above, according to the present invention, it is possible to provide a multilayer ceramic capacitor and a circuit board capable of reducing ESL.

It is to be understood that both the foregoing general description and the following detailed description are exemplary and explanatory, and are intended to provide further explanation of the invention as claimed.

DETAILED DESCRIPTION OF EMBODIMENTS

Figure 1:
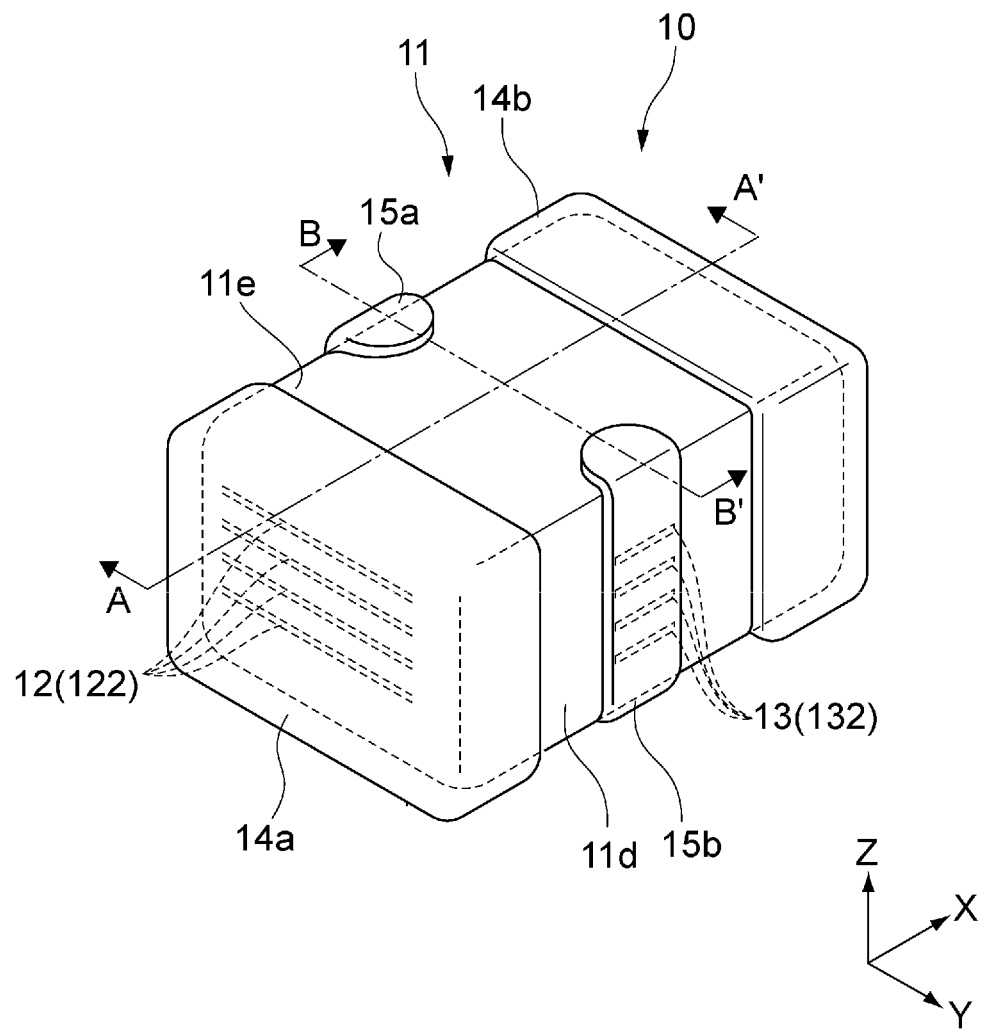
FIG. 1 is a diagram showing a multilayer ceramic capacitor according to a first embodiment of the invention.

Hereinafter, embodiments of the present invention will be described with reference to the drawings.

The drawing shows the X-axis, Y-axis, and Z-axis that are orthogonal to each other as appropriate. The X-axis, Y-axis, and Z-axis are common in all drawings.

First Embodiment

[Structure of Multilayer Ceramic Capacitor 10]

Figure 2:
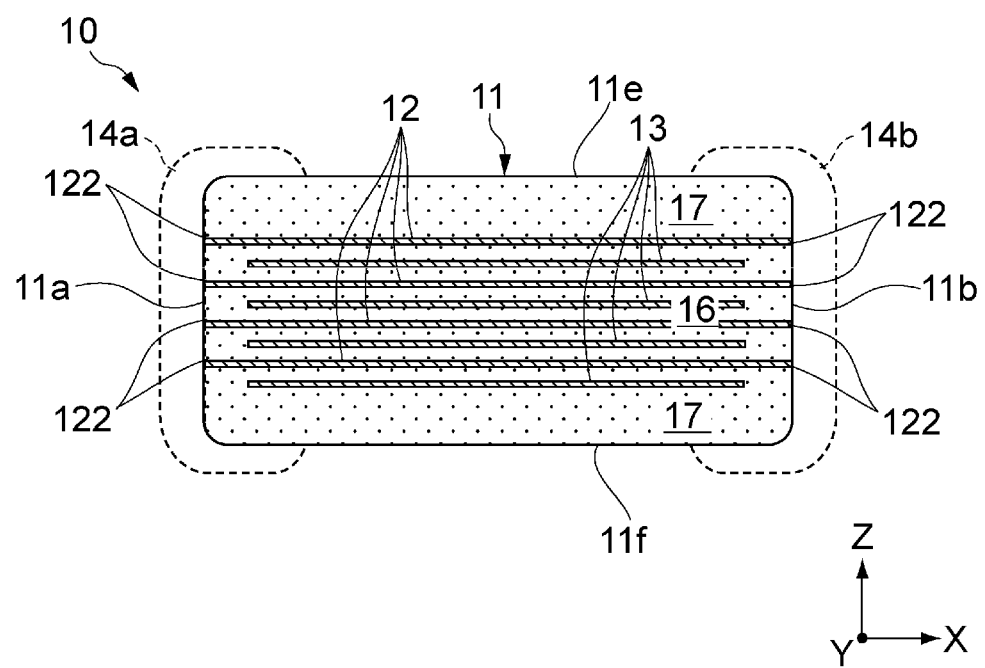
FIG. 2 is a cross-sectional view of the multilayer ceramic capacitor taken along the line A-A' in FIG. 1.
Figure 3:
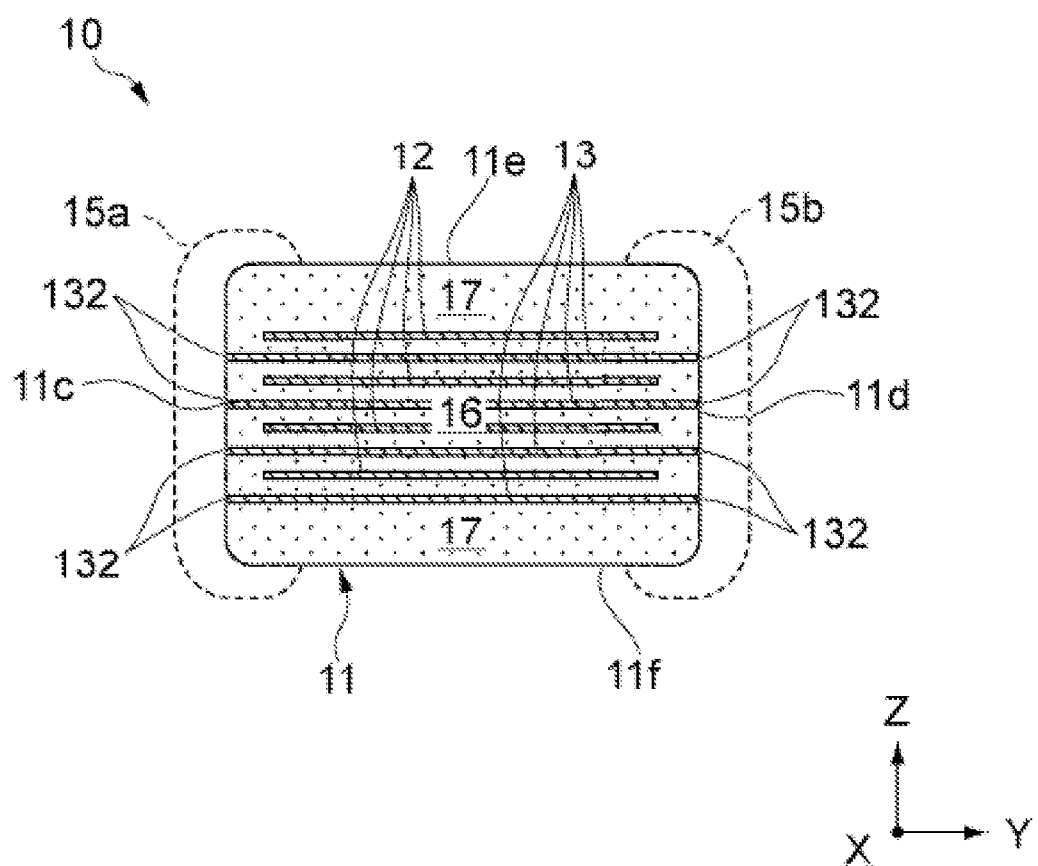
FIG. 3 is a cross-sectional view of the multilayer ceramic capacitor taken along the line B-B' of FIG. 1.

FIGS. 1 to 3 are diagrams showing a multilayer ceramic capacitor 10 according to a first embodiment of the present invention. FIG. 1 is a perspective view of the multilayer ceramic capacitor 10. FIG. 2 is a cross-sectional view of the multilayer ceramic capacitor 10 taken along the line A-A' of FIG. 1. FIG. 3 is a cross-sectional view of the multilayer ceramic capacitor 10 taken along the line B-B' of FIG. 1.

The multilayer ceramic capacitor 10 is a multilayer ceramic capacitor of a three-terminal type including a ceramic body 11, a first end surface external electrode 14a, a second end surface external electrode 14b, a first side surface external electrode 15a, and a second side surface external electrode 15b.

In the multilayer ceramic capacitor 10, for example, the end surface external electrodes 14a and 14b are configured as source electrodes, and the side surface external electrodes 15a and 15b function as ground electrodes.

The surface of the ceramic body 11 includes a first end surface 11a and a second end surface 11b perpendicular to the X axis, a first side surface 11c and a second side surface 11d perpendicular to the Y axis, and a first main surface 11e and a second main surface 11f perpendicular to the Z axis. That is, the ceramic body 11 has a substantially rectangular parallelepiped shape. It is preferable that the ceramic body 11 is chamfered so that the ridges (corners) connecting the surfaces are rounded. In FIG. 1, the structure of the ceramic body 11 covered with the external electrodes is indicated by broken lines.

Although the dimensions of the multilayer ceramic capacitor 10 are not particularly limited, they can be, for example, within the following ranges. The maximum dimension (length dimension) in the X-axis direction of the multilayer ceramic capacitor 10 is, for example, 0.25 mm or more and 4.5 mm or less. The maximum dimension (width dimension) in the Y-axis direction of the multilayer ceramic capacitor 10 is, for example, 0.125 mm or more and 3.2 mm or less. The maximum dimension (height dimension) in the Z-axis direction of the multilayer ceramic capacitor 10 is, for example, 0.125 mm or more and 3.2 mm or less. The size of the multilayer ceramic capacitor 10 may be, when expressed as length×width×height, 1.6 mm×0.8 mm×0.8 mm, 1.0 mm×0.5 mm×0.5 mm, 0.6 mm×0.3 mm×0.3 mm, or 1.2 mm×0.9 mm×0.5 mm, for example.

The end surface external electrodes 14a and 14b are arranged on the end surfaces 11a and 11b, respectively, facing each other in the X-axis direction. The end surface external electrodes 14a and 14b are both connected to first internal electrodes 12, which will be described later, and have the same polarity. In the example shown in FIGS. 1 and 2, the first end surface external electrode 14a covers the first end surface 11a and extends from the first end surface 11a to the main surfaces 11e and 11f and the side surfaces 11c and 11d. Similarly, the second end surface external electrode 14b in this example covers the second end surface 11b and extends from the second end surface 11b to the main surfaces 11e and 11f and the side surfaces 11c and 11d.

The side external electrodes 15a and 15b face each other in the Y-axis direction and are arranged on the side surfaces 11c and 11d, respectively. The side surface external electrodes 15a and 15b are both connected to second internal electrodes 13, which will be described later, and have the same polarity that is different from the end surface external electrodes 14a and 14b. In the example shown in FIGS. 1 and 3, the first side surface external electrode 15a is arranged on the first side surface 11c and extends from the first side surface 11c to the main surfaces 1l and 11f. Similarly, the second side surface external electrode 15b in this example is arranged on the second side surface 11d and extends from the second side surface 11d to the main surfaces 11e and 11f.

The end surface external electrodes 14a, 14b and the side surface external electrodes 15a, 15b are made of a good electrical conductor. The good electrical conductors forming the end surface external electrodes 14a and 14b and the side surface external electrodes 15a and 15b include metals or alloys having copper (Cu), nickel (Ni), tin (Sn), palladium (Pd), platinum (Pt), silver (Ag), or gold (Au), as a main component. The end surface external electrodes 14a, 14b and the side surface external electrodes 15a, 15b include, for example, a sintered film obtained by baking a conductive paste. Furthermore, the end surface external electrodes 14a, 14b and the side surface external electrodes 15a, 15b may include one or more plating films on the sintered film.

The ceramic body 11 has an electrode laminate portion 16 and a pair of cover portions 17. The electrode laminate portion 16 has a configuration in which the first internal electrodes 12 and the second internal electrodes 13 are alternately laminated in the Z-axis direction via ceramic layers. The pair of cover portions 17 respectively cover the upper and lower surfaces of the electrode laminate portion 16 in the Z-axis direction.

The internal electrodes 12 and 13 are good electrical conductors and are made of metal conductors. Materials for forming the internal electrodes 12 and 13 include, for example, metals or alloys containing nickel (Ni) as a main component. The number of layers of the internal electrodes 12 and 13 is not particularly limited, and can be, for example, 20-1200.

The ceramic body 11 is formed, for example, by laminating ceramic green sheets to produce an unfired laminated chip and firing the laminated chip. The portion corresponding to the electrode laminate portion 16 of the laminated chip are constructed by alternately laminating a ceramic green sheet on which an electrode pattern corresponding to the first internal electrode 12 is formed and a ceramic green sheet on which an electrode pattern corresponding to the second internal electrode 13 is formed. The electrode pattern is formed, for example, by printing a conductive paste. A portion corresponding to the cover portion 17 of the laminated chip is formed by laminating ceramic green sheets that do not include electrode patterns on the upper and lower surfaces, respectively, in the Z-axis direction of the laminated body for forming the electrode laminate portion 16.

Figure 4A:
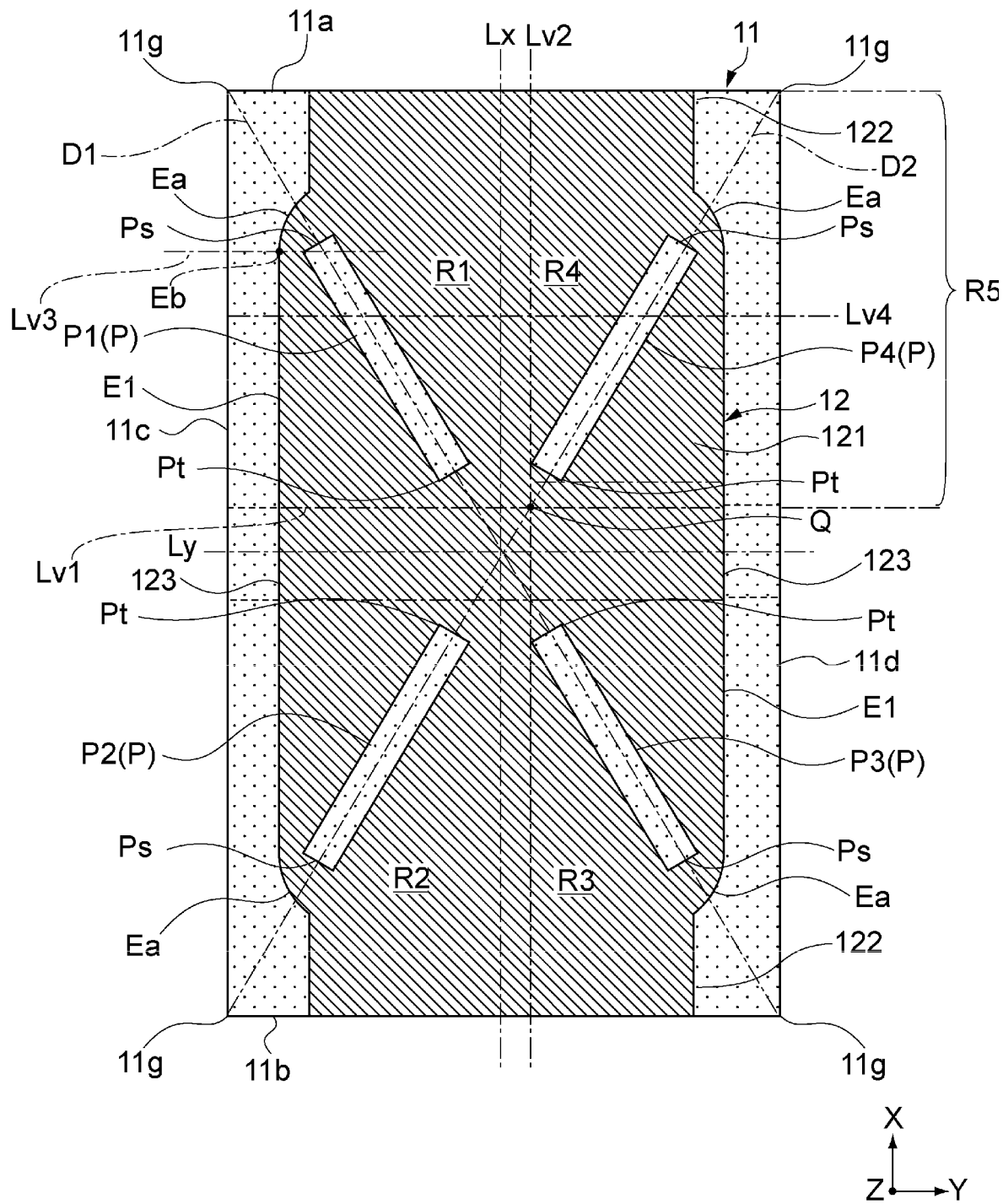
FIG. 4A is a cross-sectional view of the ceramic body of the multilayer ceramic capacitor, showing a cross section cut parallel to the first axial direction and the second axial direction at the position of the first internal electrode.

FIG. 4A is a cross-sectional view of the ceramic body 11, showing a cross section cut parallel to the XY plane at the position of the first internal electrode 12.

As shown in FIG. 4A, the first internal electrode 12 includes a first electrode main body portion 121 and a pair of first lead-out portions 122. The first electrode main body portion 121 faces the second electrode main body portion 131 of the second internal electrode 13, which will be described later, in the Z-axis direction. A pair of first lead-out portions 122 extend from the first electrode main body portion 121 to the first end surface 11a and the second end surface 11b, respectively. As a result, these first lead-out portions 122 are connected to the end surface external electrodes 14a and 14b, respectively.

Figure 4B:
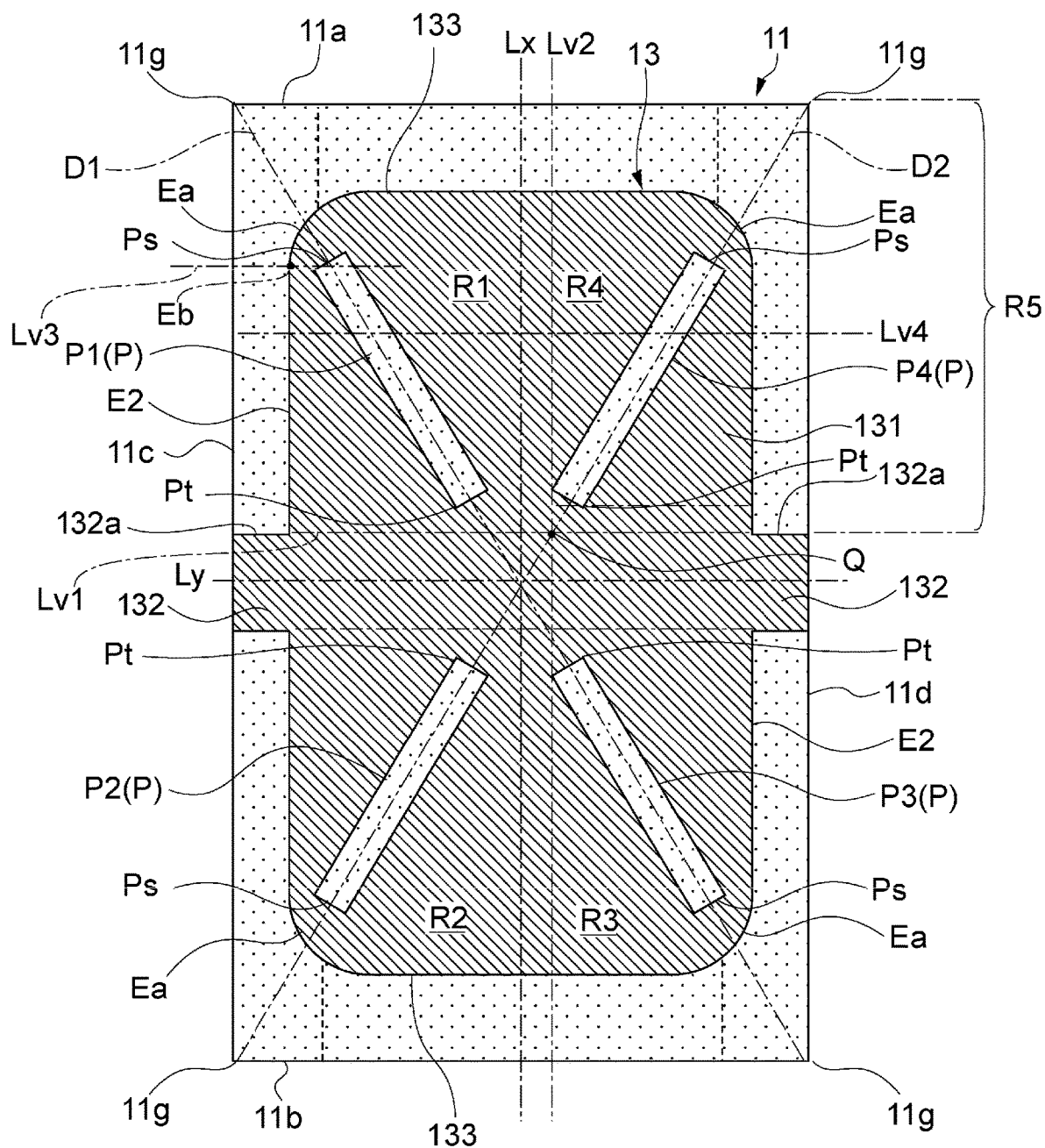
FIG. 4B is a cross-sectional view of the ceramic body of the multilayer ceramic capacitor, showing a cross section cut parallel to the first axial direction and the second axial direction at the position of the second internal electrode.
Figure 4B:
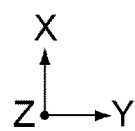

FIG. 4B is a cross-sectional view of the ceramic body 11, showing a cross section cut parallel to the XY plane at the position of the second internal electrode 13.

As shown in FIG. 4B, the second internal electrode 13 includes a second electrode main body portion 131 and a pair of second lead-out portions 132. The second electrode main body portion 131 faces the first electrode main body portion 121 of the first internal electrode 12 in the Z-axis direction. A pair of second lead-out portions 132 extend from the second electrode main body portion 131 to the first side surface 11c and the second side surface 11d, respectively. As a result, these second lead-out portions 132 are connected to the side external electrodes 15a and 15b, respectively.

In the multilayer ceramic capacitor 10, when a voltage is applied between the end surface external electrodes 14a, 14b and the side surface external electrodes 15a, 15b, the ceramic layers between the first internal electrodes 12 and the second internal electrodes 13 are charged with voltage applied. As a result, in the multilayer ceramic capacitor 10, an electric charge corresponding to the voltage between the end surface external electrodes 14a, 14b and the side surface external electrodes 15a, 15b is stored.

In the ceramic body 11, dielectric ceramics with a high dielectric constant are used in order to increase the capacity of each ceramic layer between the internal electrodes 12 and 13. The dielectric ceramics can be mainly composed of, for example, a ceramic material having a perovskite structure represented by the general formula $ABO_3$. The perovskite structure may contain $ABO_{3-\alpha}$ outside the stoichiometric composition. The ceramic materials having a perovskite structure include, for example, materials containing barium (Ba) and titanium (Ti), typified by barium titanate ($BaTiO_3$), specifically, for example, $Ba_{1-x-y}Ca_xSr_yTi_{1-z}Zr_zO_3$ ($0 \leq x \leq 1$, $0 \leq y \leq 1$, $0 \leq z \leq 1$).

The dielectric ceramics may be a composite system material of strontium titanate ($SrTiO_3$), calcium titanate ($CaTiO_3$), magnesium titanate ($MgTiO_3$), calcium zirconate ($CaZrO_3$), calcium zirconate titanate ($Ca(Ti, Zr, Ti)O_3$), barium calcium titanate zirconate (($Ba, Ca$) ($Ti, Zr$) $O_3$), barium zirconate ($BaZrO_3$), or titanium oxide ($TiO_2$).

The thickness dimension along the Z-axis direction of the ceramic layers between the internal electrodes 12 and 13 can be set by taking into account the desired capacitance, the number of layers of the internal electrodes 12 and 13, the material of the ceramic layers, the size of the ceramic body 11, and the like. For example, it can be set to about 0.3 μm to 3.0 μm.

The thickness dimension along the Z-axis direction of each of the internal electrodes 12 and 13 can be, for example, about 0.3 μm to 2.0 μm.

[Structure of Internal Electrodes]

A detailed configuration of the internal electrodes 12 and 13 will be described with reference to FIGS. 4A and 4B.

In the following description, the first center line Lx is an imaginary line that bisects the electrode main body portions 121 and 131 in the Y-axis direction and extends in the X-axis direction. The second center line Ly is an imaginary line that bisects the electrode main body portions 121 and 131 in the X-axis direction and extends in the Y-axis direction.

"X-axis direction outer side" means the side away from the second center line Ly. "X-axis direction inner side" means the side closer to the second center line Ly.

"Y-axis direction outer side" means the side away from the first center line Lx. "Y-axis direction inner side" means the side closer to the first center line Lx.

The electrode main body portions 121 and 131 are substantially rectangular and are arranged apart from the end surfaces 11a and 11b and the side surfaces 11c and 11d. The first electrode main body portion 121 includes an outer edge portion E1 forming an outer edge other than the base portion of the first lead-out portion 122. The second electrode main body portion 131 includes an outer edge portion E2 forming an outer edge other than the base portion of the second lead-out portion 132. In this embodiment, the corners of the electrode main body portions 121 and 131 are configured as rounded curved portions Ea.

A pair of first lead-out portions 122 of the first internal electrode 12 extends outward in the X-axis direction from the outer edge portion E1 of the first electrode main body portion 121. The width of the first lead-out portion 122 in the Y-axis direction is not particularly limited, and may be formed between the rounded curved portions Ea facing each other in the Y-axis direction or may be formed to have the same width as the width of the first electrode main body portion 121.

A pair of second lead-out portions 132 of the second internal electrode 13 extends outward in the Y-axis direction from the outer edge portion E2 of the second electrode main body portion 131. The width of the second lead-out portion 132 in the X-axis direction is not particularly limited, and may be, for example, 5% or more and 50% or less of the length of the second electrode main body portion 131 in the X-axis direction.

Also, a portion of the outer edge E1 of the first electrode main body portion 121 that faces the base of the second lead-out portion 132 in the Z-axis direction is referred to as a second lead-out facing portion 123. Similarly, a portion of the outer edge E2 of the second electrode main body portion 131 that faces the base of the first lead-out portion 122 in the Z-axis direction is defined as a first lead-out facing portion 133.

In the present embodiment, the internal electrodes 12 and 13 are arranged line-symmetrically with respect to the first center line Lx and the second center line Ly. Therefore, the first center line Lx passes through the position that divides the end surface external electrodes 14a and 14b into approximately equal halves in the Y-axis direction, and the second center line Ly passes through the position that divides the side surface external electrodes 15a and 15b into approximately equal halves in the X-axis direction. The four regions sectioned by the first center line Lx and the second center line Ly are defined as a first region (quadrant) R1, a second region (quadrant) R2, a third region (quadrant) R3, and a fourth region (quadrant) R4, respectively.

The first region R1 is the region on the side of the first end surface 11a and the first side surface 11c. The second region R2 is a region on the side of the second end surface 11b and the first side surface 11c. The third region R3 is a region on the side of the second end surface 11b and the second side surface 11d. The fourth region R4 is a region on the side of the first end surface 11a and the second side surface 11d.

Furthermore, in this embodiment, the electrode main body parts 121 and 131 are provided with the following configuration for the purpose of regulating the current paths in the internal electrodes 12 and 13 and reducing the equivalent series inductance (ESL).

That is, the electrode main body portions 121 and 131 in this embodiment respectively have a first current regulating portion P1, a second current regulating portion P2, a third current regulating portion P3, and a fourth current regulating portion P4. In this embodiment, the first current regulating portion P1 is arranged, for example, in the first region R1. The second current regulating portion P2 is arranged, for example, in the second region R2. The third current regulating portion P3 is arranged, for example, in the third region R3. The fourth current regulating portion P4 is arranged, for example, in the fourth region R4.

In the following description, when there is no need to distinguish among the first current regulating portion P1, the second current regulating portion P2, the third current regulating portion P3, and the fourth current regulating portion P4, each of these will be referred to as "current regulating portion P".

In this embodiment, the current regulating portion P is a cutout portion that does not substantially have an electrode material in the electrode main body portions 121 and 131. In other words, the current regulating portion P is an insulating portion formed apart from the outer edge portions E1 and E2 of the electrode main body portions 121 and 131 and through which no current flows. Such a current regulating portion P is formed, for example, by adjusting the shape of a screen or a mask used when printing the conductive paste on the ceramic green sheet so that the conductive paste does not adhere to the region corresponding to the current regulating portion P. In the multilayer ceramic capacitor 10, the cutout portion may be a gap, or may be composed of ceramic layers adjacent in the Z-axis direction. Alternatively, the cutout portion may be composed of a mixture of voids and the ceramic layer. Note that the phrase "substantially free of electrode material" includes a situation in which a portion of the electrode material adheres or diffuses during the manufacturing process or the like, resulting in a slight amount of the electrode material therein.

In order to explain the effects of the current regulating portion P, first, the relationship between the ESL and the current paths in the internal electrodes 12 and 13 will be explained using the configuration of a conventional general three-terminal multilayer ceramic capacitor.

Figure 5A:
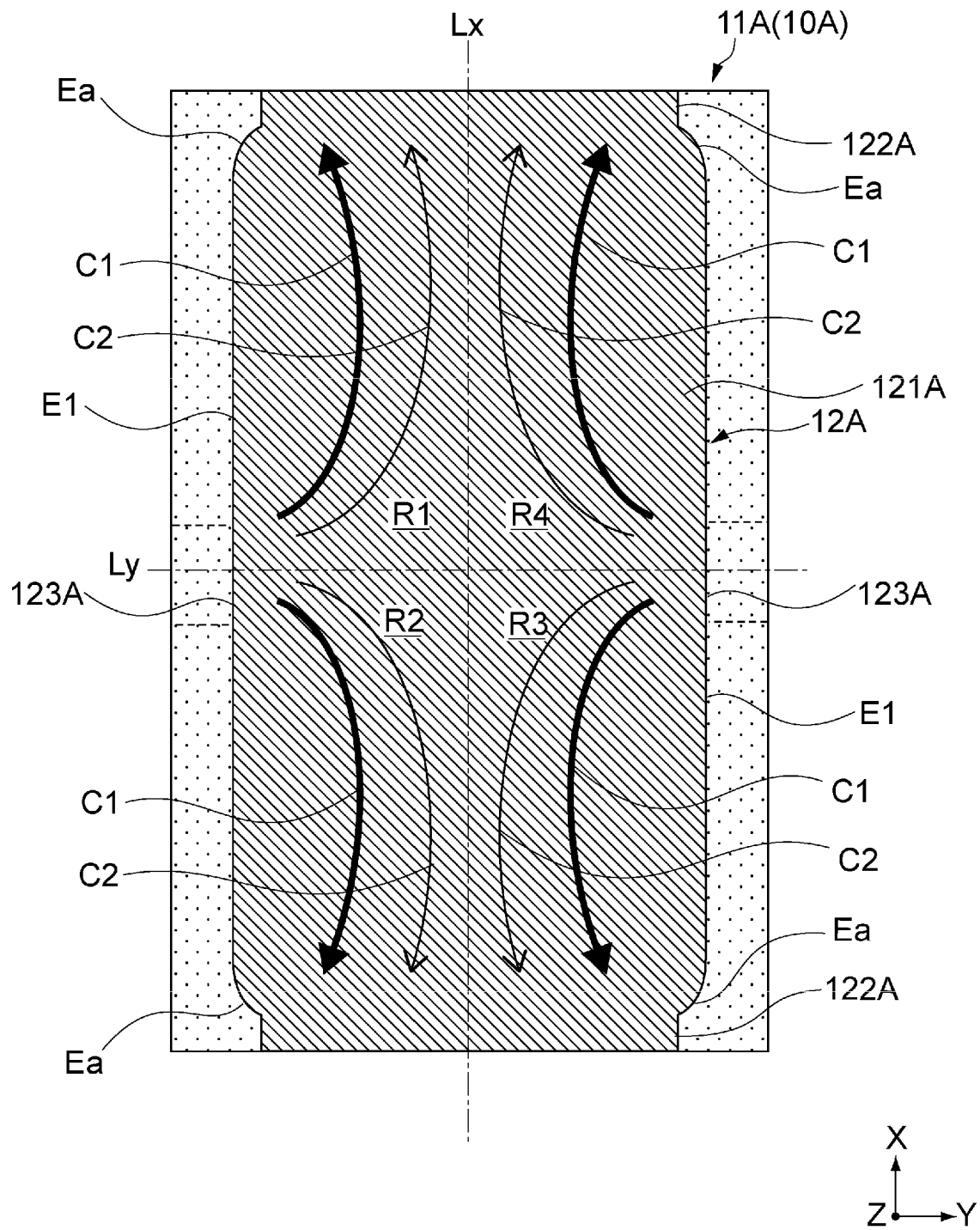
FIG. 5A is a cross-sectional view of a ceramic body of a multilayer ceramic capacitor according to Comparative Example 1, showing a cross section cut parallel to the first axial direction and the second axial direction at the position of the first internal electrode.
Figure 5B:
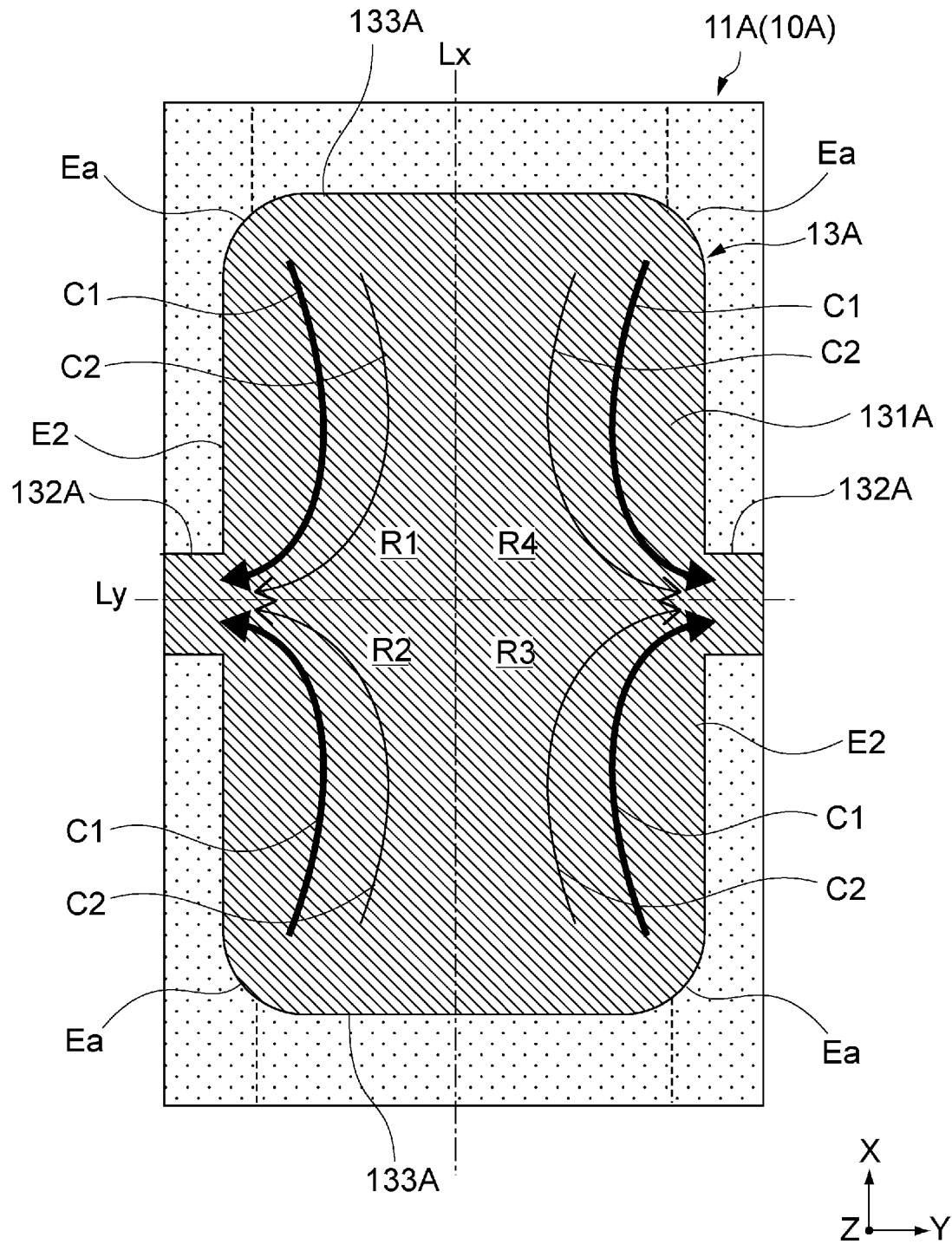
FIG. 5B is a cross-sectional view of the ceramic body of the multilayer ceramic capacitor according to Comparative Example 1, showing a cross section cut parallel to the first axial direction and the second axial direction at the position of the second internal electrode.

FIGS. 5A and 5B are cross-sectional views of a ceramic body 11A of a multilayer ceramic capacitor 10A according to Comparative Example 1. FIG. 5A shows a cross section cut parallel to the XY plane at the position of the first internal electrode 12A, and FIG. 5B shows a cross section cut parallel to the XY plane at the position of the second internal electrode 13A.

The multilayer ceramic capacitor 10A has the same configuration as the multilayer ceramic capacitor 10, except that the internal electrodes 12A and 13A do not have the current regulating portions P.

Specifically, similarly to the first internal electrode 12, the first internal electrode 12A includes a first electrode main body portion 121A including an outer edge portion E1 and a pair of first lead-out portions 122A, but does not have a current regulating portion P.

The second internal electrode 13A includes a second electrode main body portion 131A including an outer edge portion E2 and a pair of second lead-out portions 132A, but does not have a current regulating portion P.

In the multilayer ceramic capacitor 10A, when an AC voltage with a predetermined frequency is applied between the end surface external electrodes 14a, 14b and the side surface external electrodes 15a, 15b (not shown in FIGS. 5A and 5B), in the internal electrodes 12A, 13A, electric charges move with a period corresponding to the frequency, and an electric current is generated. In this case, in the first to fourth regions R1 to R4 of the electrode main body portions 121A and 131A, currents flow in the paths connecting between the lead-out portions 122A and 132A and the lead-out facing portions 123A and 133A, respectively, which are adjacent to each other across the curved portion Ea (corner portion). That is, the current distributions in each of the first to fourth regions R1 to R4 are symmetrical with respect to the center lines Lx and Ly.

The current path length in the internal electrodes 12A and 13A has a positive correlation with the resistance value in the electrodes. Therefore, the three-terminal multilayer ceramic capacitor 10A has a shorter current path length and a lower ESL than a two-terminal multilayer ceramic capacitor in which a pair of external electrodes are arranged at the ends in the X-axis direction.

On the other hand, in recent years, as electronic components have become more sophisticated, the multilayer ceramic capacitor 10A may be used in a high frequency band, for example, 1 GHz or higher. Therefore, there is a demand for a configuration that can further reduce the ESL even in such a high frequency band.

Therefore, in order to examine such a configuration, the present inventors used a model having a configuration similar to that of the multilayer ceramic capacitor 10A of Comparative Example 1 to conduct a simulation for visualizing current vectors in the internal electrodes 12A and 13A.

In this simulation, the multilayer ceramic capacitor 10A having the above configuration was mounted on a substrate including signal electrodes connected to a signal source and ground electrodes. This board had the same configuration as the substrate body 110 of the circuit board 100 shown in FIG. 7.

The end surface external electrodes 14a and 14b are connected to the signal electrodes, and the side surface external electrodes 15a and 15b are connected to the ground electrodes. Then, assuming that a voltage was applied to the signal electrodes at a frequency of 1 GHz, the distribution and temporal change of the current vectors in the internal electrodes 12A and 13A were analyzed.

The arrows in FIGS. 5A and 5B schematically show the current density and direction based on the current vector distribution obtained in this simulation. A thick arrow schematically indicates the current C1 in the region of high current density. A thin arrow schematically indicates the current C2 in the low current density region. In addition to the fact that the directions of the currents change over time, currents that are out of phase by approximately 180 degrees are generated in the internal electrodes 12A and 13A. Therefore, the directions of the arrows in FIGS. 5A and 5B indicate an example of the current direction at a certain point in time.

In the example shown in FIG. 5A, the currents C1 and C2 directed inward in the Y-axis direction from the second lead-out facing portion 123A turn outward in the X-axis direction and reach the first lead-out portion 122A.

Similarly, in the example shown in FIG. 5B, currents C1 and C2 directed inward in the X-axis direction from the first lead-out facing portion 133A turn outward in the Y-axis direction and reach the second lead-out portion 132A.

In other words, the paths of these currents C1 and C2 can curve between the adjacent lead-out portions 122A and 132A and the lead-out facing portions 123A and 133A.

In addition, as shown by the currents C1 and C2, it was found that the current density distributed near the outer edges E1 and E2 was high in both the internal electrodes 12A and 13A. This suggests that by further increasing the current density in the vicinity of the outer edges E1 and E2, the increase in the current path length can be suppressed and the ESL can be further reduced.

Therefore, in order to regulate a current path, such as the current C2, that passes through a region away from the outer edges E1 and E2, as shown in FIGS. 4A-4B, the current regulating portion P is arranged so as to be spaced apart from the outer edges E1 and E2 and have an elongate shape extending in a longitudinal direction in the present embodiment. The "longitudinal direction" of the current regulating portion P is the direction in which the current regulating portion P extends.

In each current regulating portion P, when the ratio of the maximum dimension in the longitudinal direction to the maximum dimension in the transverse direction perpendicular to the longitudinal direction is taken as the aspect ratio, this aspect ratio exceeds 1, for example. The aspect ratio may be, for example, 3 or more, or 1000 or less.

In the examples shown in FIGS. 4A and 4B, each of the current regulating portions P is formed in a continuous straight line, but the present embodiment is not limited to this. For example, the current regulating portion P can have any shape such as a straight line, a curved line, a wavy line, a rectangular shape, an elliptical shape, and a dashed line.

Figure 6A:
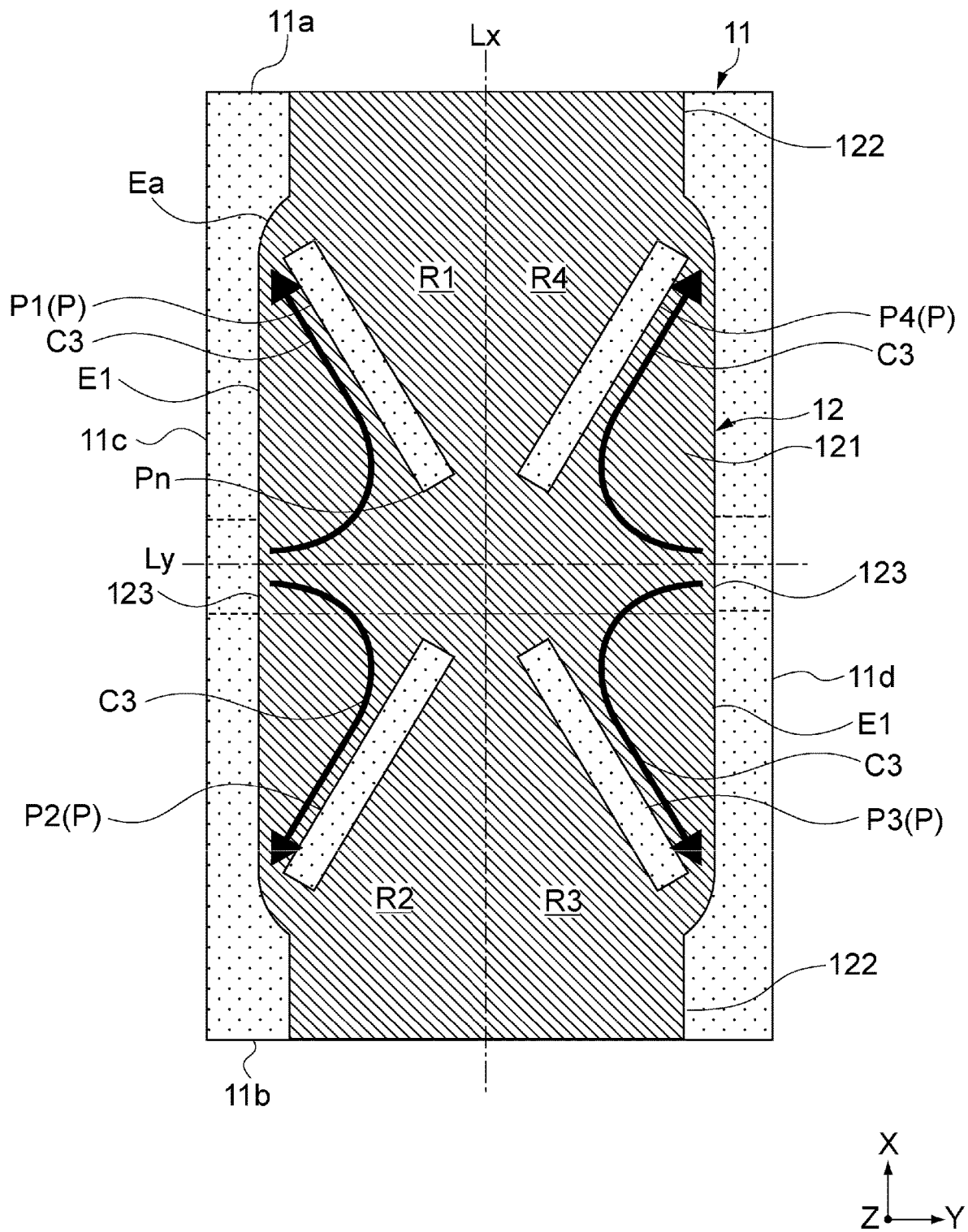
FIG. 6A is a cross-sectional view similar to FIG. 4A of the ceramic body, with arrows schematically indicating the density and direction of current obtained by simulation.
Figure 6B:
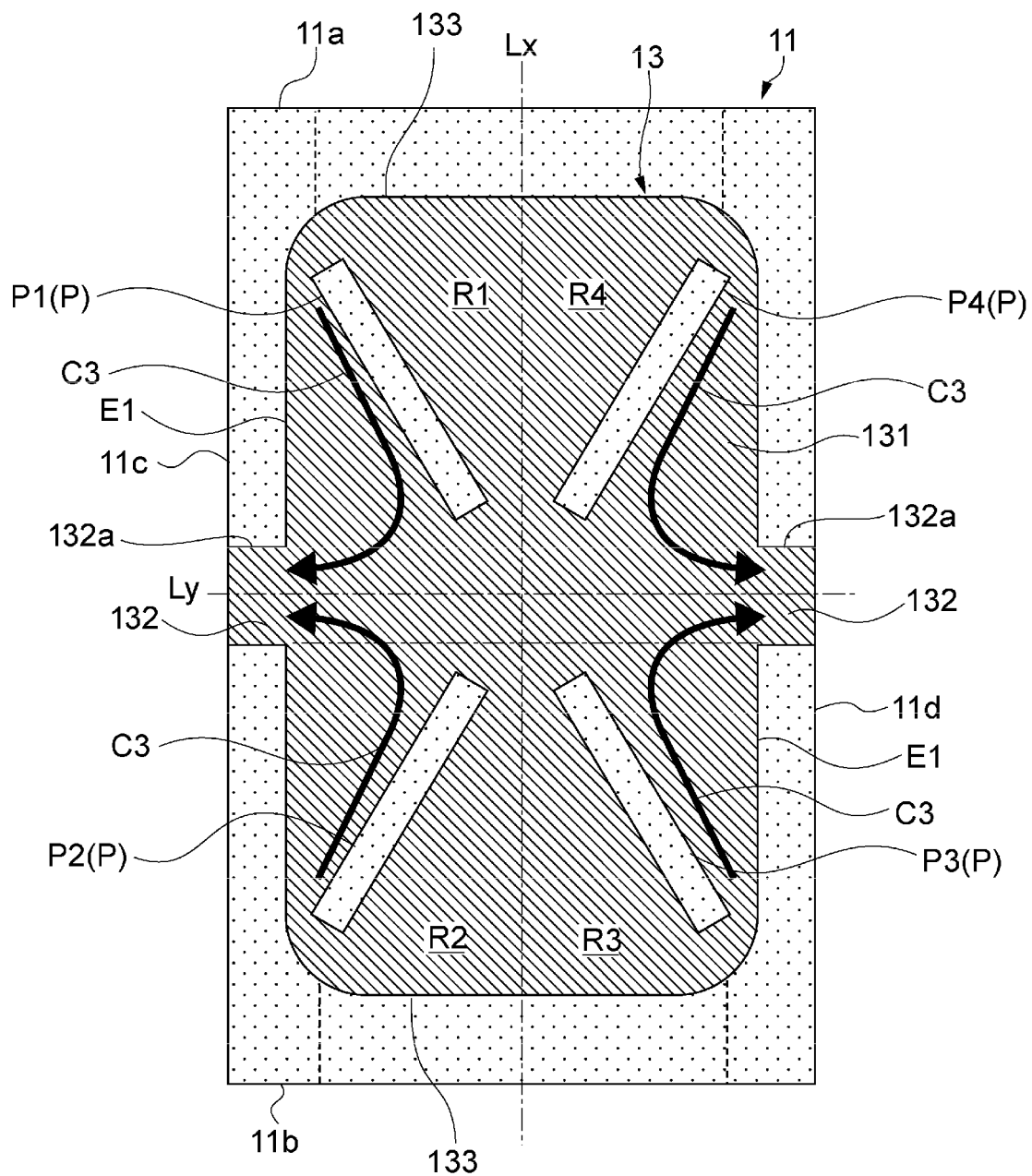
FIG. 6B is a cross-sectional view similar to FIG. 4B of the ceramic body, with arrows schematically indicating the density and direction of the current obtained by simulation.
Figure 6B:
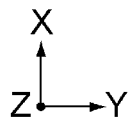

By providing the current regulating portions P, as shown in FIGS. 6A and 6B, the current C3 passing through the electrode main body portions 121 and 131 is distributed so as to avoid the current regulating portion P, and the current C3 is easily distributed near the outer edges E1 and E2. For example, the current regulating portion P can direct current along the current regulating portion P by blocking current that would flow away from areas of high current density and away from the outer edges E1 and E2. As a result, the currents C3 can be guided to have a short path length without hindering the currents C3 from going to the first lead-out portion 122 or the second lead-out portion 132. Therefore, it is possible to further increase the current density near the outer edges E1 and E2 and reduce the ESL.

In fact, the inventors performed a simulation similar to Comparative Example 1 using a model of a circuit board on which the multilayer ceramic capacitor 10 of this embodiment was mounted. As a result, it was found that the internal electrodes 12, 13 of the multilayer ceramic capacitor 10 of the present embodiment can have higher current densities near the outer edges E1, E2 than the internal electrodes 12A, 13A of Comparative Example 1. In addition, since the circuit board 100 of the present embodiment had a lower ESL value than the circuit board of Comparative Example 1, it was shown that the ESL can be reduced as a characteristic of the multilayer ceramic capacitor 10 itself.

The configuration of the circuit board 100 will be described below.

Figure 7A:
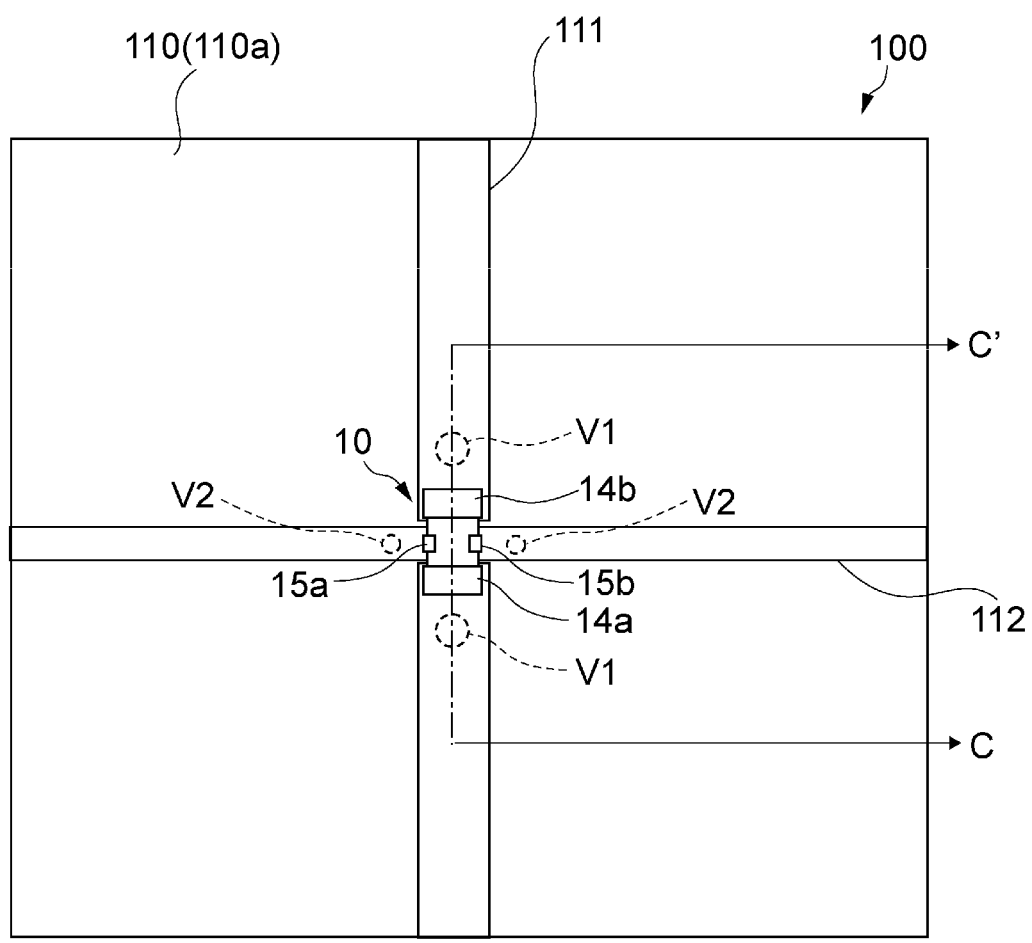
FIG. 7A is a plan view showing a circuit board including the multilayer ceramic capacitor.
Figure 7B:
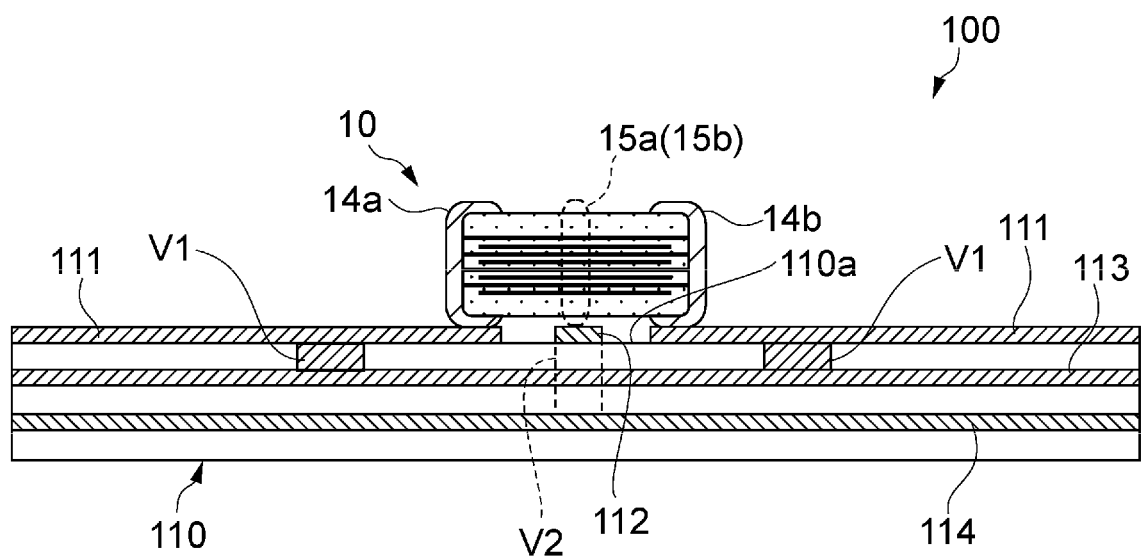
FIG. 7B is a partial cross-sectional view of the circuit board taken along the line C-C' of FIG. 7A.
Figure 7B:
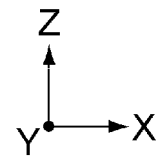

FIGS. 7A-7B are schematic diagrams showing the circuit board 100 of this embodiment. FIG. 7A is a plan view of the circuit board 100 viewed from the Z-axis direction. FIG. 7B is a partial cross-sectional view of the circuit board 100 taken along the line C-C' of FIG. 7A.

The circuit board 100 has a multilayer ceramic capacitor 10 and a substrate body 110 on which the multilayer ceramic capacitor 10 is mounted.

The substrate body 110 has a mounting surface 110a, signal electrodes 111, ground electrodes 112, a signal conductor layer 113, a ground conductor layer 114, a pair of first vias V1, and a pair of second vias V2.

The mounting surface 110a faces the multilayer ceramic capacitor 10 in the Z-axis direction.

The signal electrodes 111 are arranged on the mounting surface 110a and connected to the end surface external electrodes 14a and 14b.

The signal conductor layer 113 is arranged inside the substrate body 110 and connected to the signal electrodes 111 via a pair of first vias V1. The signal conductor layer 113 is connected to a signal source (not shown).

A pair of first vias V1 are provided corresponding to the pair of the end surface external electrodes 14a and 14b, and connect the signal electrodes 111 and the signal conductor layer 113, respectively.

The ground electrodes 112 are arranged on the mounting surface 110a and connected to the side external electrodes 15a and 15b.

The ground conductor layer 114 is arranged inside the substrate body 110 and connected to the ground electrode s112 via a pair of second vias V2.

The pair of second vias V2 are provided corresponding to the pair of side external electrodes 15a and 15b, and connect the ground electrodes 112 and the ground conductor layer 114.

In the above configuration, the end surface external electrodes 14a and 14b are both connected to the same signal source, and the side surface external electrodes 15a and 15b are both connected to the same ground potential. By connecting the side surface external electrodes 15a and 15b in parallel, the ESL of the circuit board 100 can be suppressed.

Furthermore, the above simulation showed that ESL can be reduced in the circuit board 100 of this embodiment more than in Comparative Example 1 when an AC voltage of 1 GHz is input to the signal conductor layer 113 (signal electrodes 111). Therefore, in the multilayer ceramic capacitor 10 of the present embodiment, the current regulating portions P can more effectively lower the ESL and remove noise even in a high frequency band. The multilayer ceramic capacitor 10 in this embodiment can be used in a high frequency range of, for example, 0.5 GHz or more and 5 GHz or less.

More specific description will be given of the effect of the current regulating portions P that are separated from the outer edge portions E1 and E2 using comparative examples.

FIGS. 8A to 11B are plan views showing first internal electrodes and second internal electrodes according to Comparative Examples 2 to 5. In these figures, the electrode portions other than the current regulating portions are hatched with oblique lines as in FIGS. 4A and 4B.

Figure 8A:
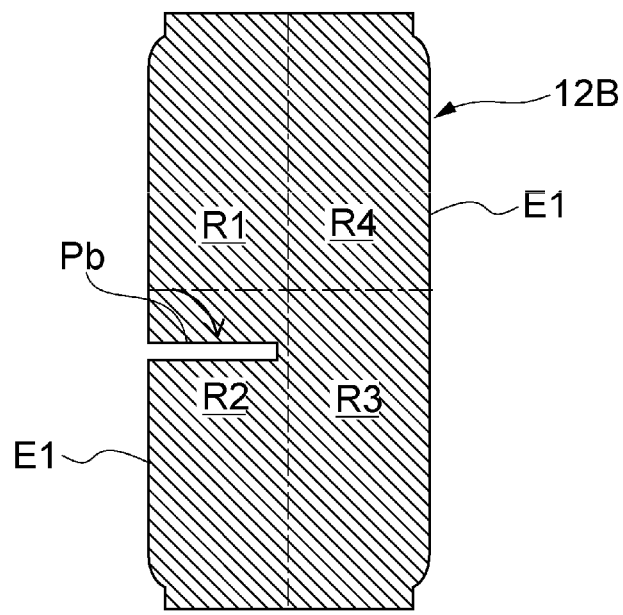
FIG. 8A is a plan view showing a first internal electrode according to Comparative Example 2.
Figure 8B:
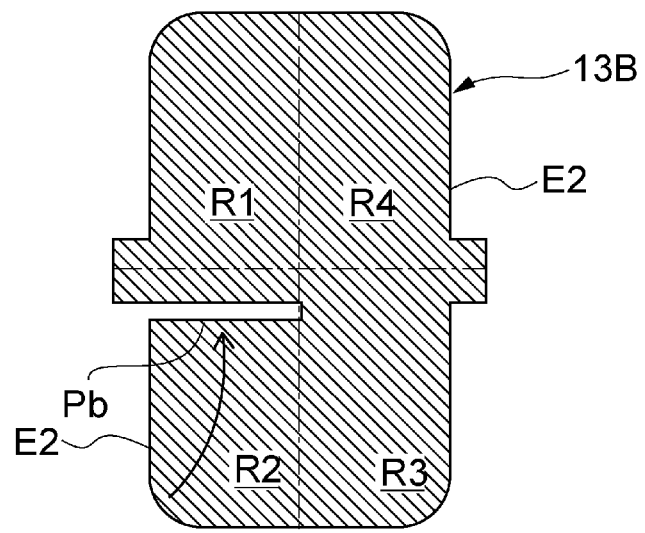
FIG. 8B is a plan view showing a second internal electrode according to Comparative Example 2.

The first and second internal electrodes 12B and 13B of Comparative Example 2 shown in FIGS. 8A and 8B each include one current regulating portion Pb. The current regulating portions Pb extends along the Y-axis direction to the outer edge portions E1 and E2 in the second region R2. In this case, as indicated by the arrows in FIGS. 8A and 8B, in the second region R2, current passing near the outer edges E1 and E2 is blocked. This may increase the path length of the current in the second region R2 and increase the ESL.

Figure 9A:
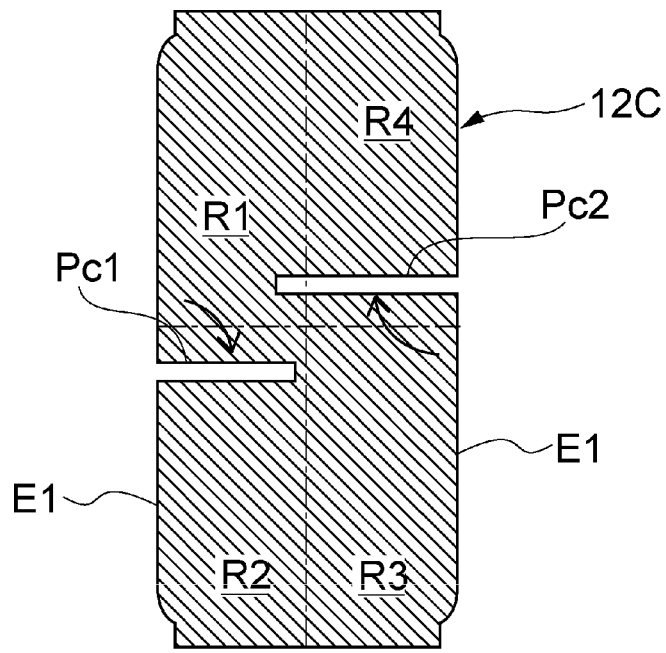
FIG. 9A is a plan view showing a first internal electrode according to Comparative Example 3.
Figure 9B:
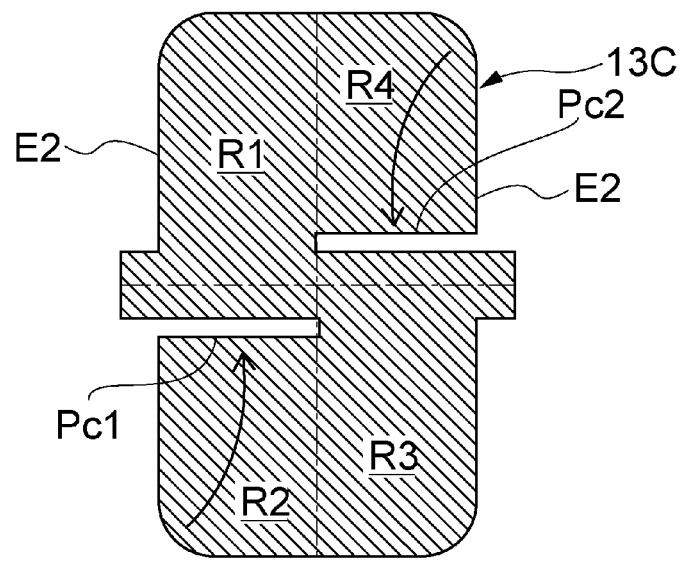
FIG. 9B is a plan view showing a second internal electrode according to Comparative Example 3.

The first and second internal electrodes 12C and 13C of Comparative Example 3 shown in FIGS. 9A and 9B have the first current regulating portion Pc1 similar to the current regulating portion Pb, and a second current regulating portion Pc2 extending to the outer edges E1, E2a along the Y-axis direction in the fourth region R4. Also in this case, as shown by the arrows in FIGS. 9A and 9B, in both the second region R2 and the fourth region R4, the current passing near the outer edges E1 and E2 is blocked, and the current path length is increased. Thus, the ESL can increase.

Figure 10A:
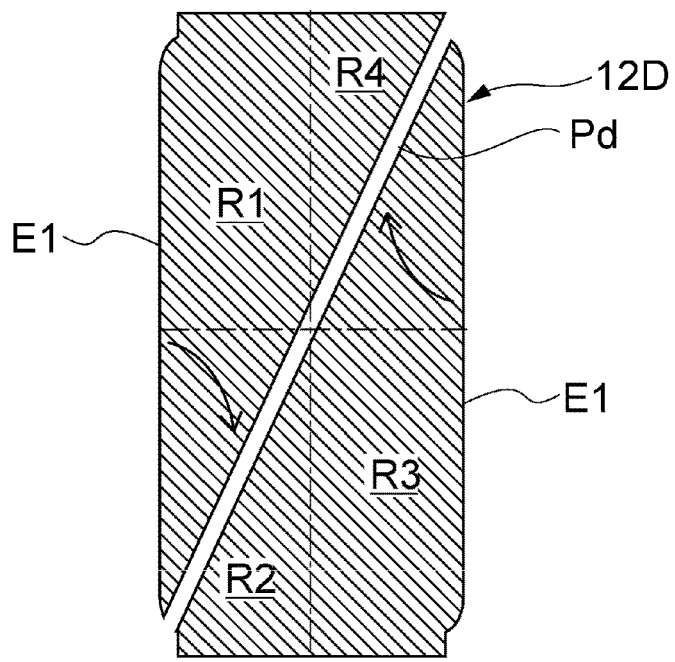
FIG. 10A is a plan view showing a first internal electrode according to Comparative Example 4.
Figure 10B:
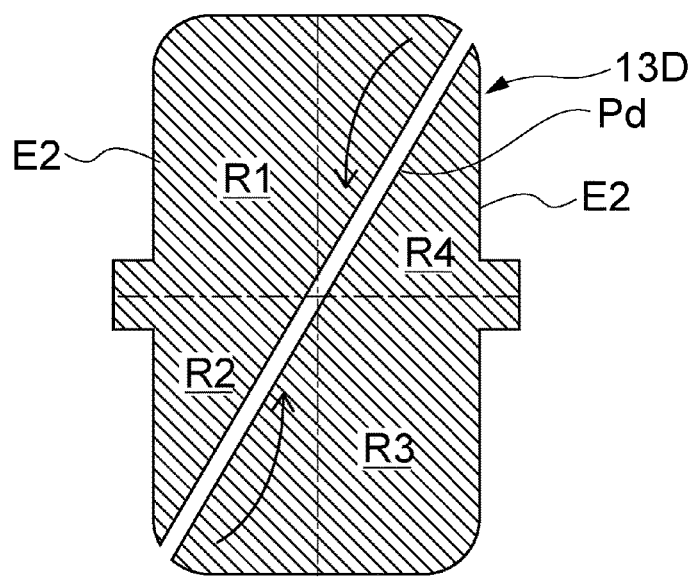
FIG. 10B is a plan view showing a second internal electrode according to Comparative Example 4.

The first and second internal electrodes 12D, 13D of Comparative Example 4 shown in FIGS. 10A and 10B include one first current regulating portion Pd. The first current regulating portion Pd extends obliquely with respect to the X-axis direction and the Y-axis direction, and extends from the corner of the outer edge E1, E2 in the second region R2 to the corner of the outer edge E1, E2 in the fourth region R4. Also in this case, as shown in FIGS. 10A and 10B, in the second region R2 and the fourth region R4, the currents passing near the outer edges E1 and E2 are blocked, and the path length of the current becomes longer. Thus, ESL can be increased.

Figure 11A:
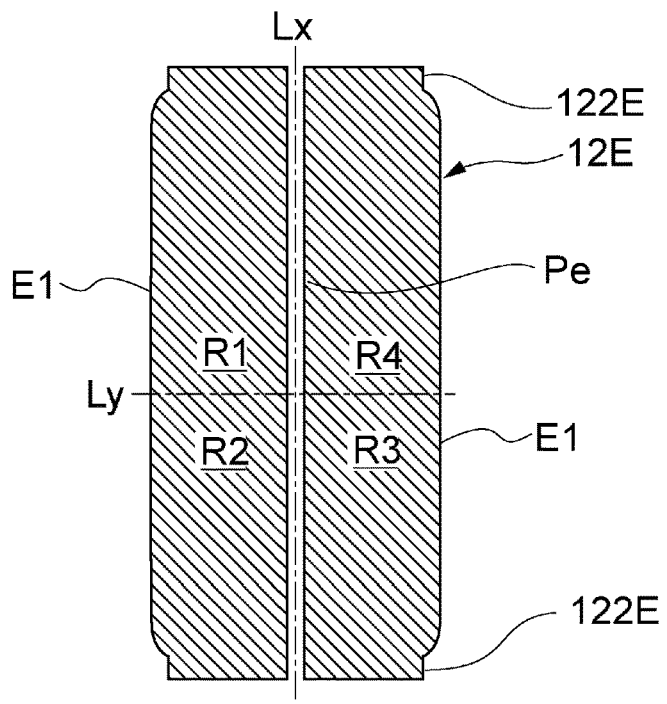
FIG. 11A is a plan view showing a first internal electrode according to Comparative Example 5.
Figure 11B:
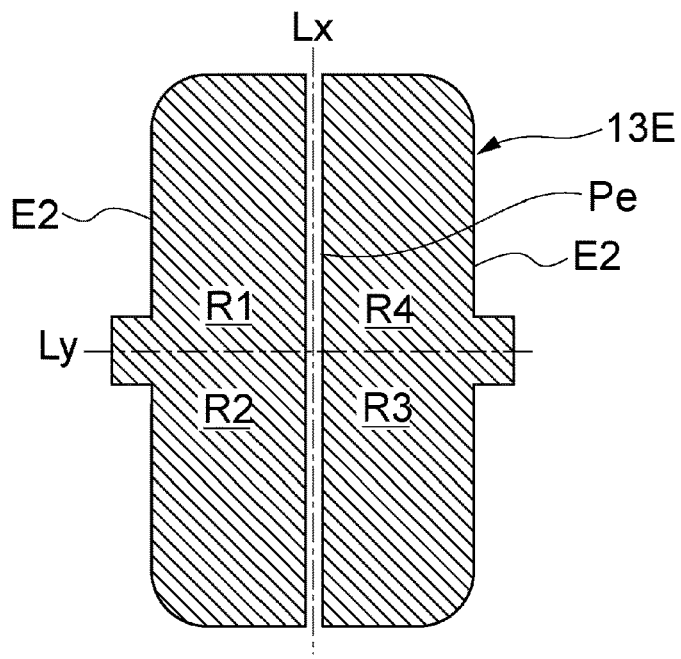
FIG. 11B is a plan view showing a second internal electrode according to Comparative Example 5.

The first and second internal electrodes 12E, 13E of Comparative Example 5 shown in FIGS. 11A and 11B include one first current regulating portion Pe. The first current regulating portion Pe extends in the X-axis direction along the first center line Lx and divides the first and second internal electrodes 12E and 13E in the Y-axis direction. In this case, the first current regulating portion Pe1 is formed in a part of the first lead-out portion 122E, and the resistance of the connection portion with the end surface external electrodes 14a and 14b, which are the source electrodes, increases. Thus, this can increase the ESL.

On the other hand, as shown in FIGS. 6A and 6B, in the first and second internal electrodes 13A according to the present embodiment, none of the current restricting portions P reach the outer edges E1 and E2. Therefore, a current path is secured between E1, E2 and the current regulating portion P. As a result, the current density increases in the vicinity of the outer edges E1 and E2, which can reduce the ESL.

In addition, since each current regulating portion P does not reach the outer edge portions E1 and E2 and is not arranged in the central portion in the X-axis direction and the Y-axis direction of the electrode main body portions 121 and 131, reduction of the electrode area due to the current regulating portions P can be minimized. Thereby, the capacitance of the multilayer ceramic capacitor 10 can be sufficiently maintained.

[Detailed Configuration of the Current Regulating Portions]

As shown in FIGS. 4A and 4B, in this embodiment, each current regulating portion P extends in the X-axis direction as a whole, for example, obliquely with respect to the X-axis direction and the Y-axis direction.

"The current regulating portion P extends in the X-axis direction as a whole" means that the current regulating portion P is formed longer in the X-axis direction such that the dimension along the X-axis direction of the current regulating portion P is larger than the dimension along the Y-axis direction.

In addition, each current regulating portion P shown in FIGS. 4A and 4B extends from the inner side to the outer side in the X-axis direction and from the inner side to the outer side in the Y-axis direction. In this embodiment, the first to fourth current restricting portions P1 to P4 radially extend from the inside to the outside in the X-axis direction and the Y-axis direction. From the viewpoint of obtaining the above-described effects, the angle formed by the direction parallel to the X-axis direction and each current regulating portion P is not particularly limited, but is, for example, 25 degrees or more and 65 degrees or less.

As a result, as shown in FIG. 6A, for example, the current that spreads obliquely from the second lead-out facing portion 123 (or the second lead-out portion 132) toward the inner side in the Y-axis direction and the outer side in the X-axis direction is guided by the current regulating portion P to flow outward in outer side in the Y-axis direction and in the outer side in the X-axis direction. As a result, in the first to fourth regions R1 to R4, curving of the current path is promoted, and the current is more likely to be guided toward the outer edges E1 and E2. Furthermore, the current flowing between the outer edges E1, E2 and the current regulating portion P can have a higher density toward the first lead-out portion 122 (or the first lead-out facing portion 133). Therefore, in this embodiment, it is possible to increase the current density in the regions along the outer edges E1 and E2 and reduce the ESL.

The current regulating portion P may have symmetry with respect to the X-axis direction and the Y-axis direction. Specifically, the first current regulating portion P1 and the second current regulating portion P2 are arranged line-symmetrically with respect to the second center line Ly, which is a straight line passing through the second lead-out portion 132 and parallel to the Y-axis direction. Similarly, the third current regulating portion P3 and the fourth current regulating portion P4 are arranged line-symmetrically with respect to the second center line Ly. The first current regulating portion P1 and the fourth current regulating portion P4, and the second current regulating portion P2 and the third current regulating portion P3 are arranged line-symmetrically with respect to the first center line Lx.

As a result, the current density in the vicinity of the outer edges E1 and E2 can be increased between any two adjacent external electrodes of the end surface external electrodes 14a and 14b and the side surface external electrodes 15a and 15b. Therefore, the ESL reduction effect can be enhanced more effectively.

In order to arrange the current regulating portions P at a preferred angle and obtain the symmetry described above, the current regulating portion P passes through the first and second internal electrodes 12 and 13 as shown in FIGS. 4A and 4B may be arranged along diagonal lines D1 and D2 connecting the corners 11g of the ceramic body 11 in a cross section cut in parallel with the XY plane.

Let us call the inner side end portion of the current regulating portion P in the X-axis direction and the Y-axis direction "an inner end portion Pt," and a virtual line extending in the Y-axis direction from a side edge portion 132a of the second lead-out portion 132 in the X-axis direction in the second electrode main body portion 131 "a first virtual line Lv1 (first central virtual line)." Similarly, in the first electrode main body portion 121, let us call a virtual line overlapping the first virtual line (first center virtual line) Lv1 in the second electrode main body portion 131 in the Z-axis direction is defined as the first virtual line Lv1 (second center virtual line) in the first electrode main body portion 121.

Then, the inner end portion Pt of the current regulating portion P may be located in the outer region R5, which is the region outside the first imaginary line Lv1 in the X-axis direction. As a result, the current obliquely extending inward in the Y-axis direction and outward in the X-axis direction from the second lead-out portion 132 can be regulated by the inner end portion Pt side of the current regulating portion P and reliably guided. In the example shown in FIGS. 4A and 4B, the inner end Pt is located on a second virtual line Lv2 extending in the X-axis direction from an intersection point Q between the first virtual line Lv1 and the diagonal lines D1 or D2 (in the illustrated example, the intersection point Q is the intersection point between the first virtual line Lv1 and the diagonal line D2).

Let us call an outer end portion in the X-axis direction and the Y-axis direction of the current regulating portion P "an outer end portion Ps." It is preferable that the outer end portion Ps of the current regulating portion P is appropriately spaced from the outer edges E1 and E2, for example. In the example shown in FIGS. 4A and 4B, the outer end portion Ps is located at an intersection between a virtual line Lv3 that passes through an end point Eb in the inner side in the x-axis direction of the curved portion Ea situated at a corner of the internal electrode 12, 13 and the diagonal line D1, D2.

The width of the current regulating portion P can be determined by considering that a clear cutout pattern is formed, that the electrode area is not significantly reduced, and that the capacitance is not greatly affected. The width of the current regulating portion P here means the maximum width in the direction orthogonal to the extending direction of each current regulating portion. The width of the current regulating portion P is not particularly limited, but is, for example, 1 μm or more and 100 μm or less, and is, for example, 5 μm or more and 50 μm or less.

Also, the ratio of the width in the transverse direction to the length in the longitudinal direction of the current regulating portion P is, for example, 0.1% or more and 80% or less, or, for example, 1% or more and 70% or less.

Furthermore, in the simulation for visualizing the current density distribution of the internal electrodes 12 and 13 described above, it was found that in a central portion in the Y-axis direction in an outer region that is obtained by further bisecting the region R5 of the electrode main body portions 121, 131 that is located outside in the X-axis direction of the first virtual line Lv1, the current density increases. Therefore, in the vicinity of the boundary line Lv4 that bisects the outer region R5 in the X-axis direction, it is considered that the current flowing into the central portion in the Y-axis direction increases. Therefore, at least one of the current regulating portions P extending in the X-axis direction is more preferably arranged so as to cross the boundary line Lv4.

Next, an example of a preferable length of each current regulating portion P will be described.

Figure 12A:
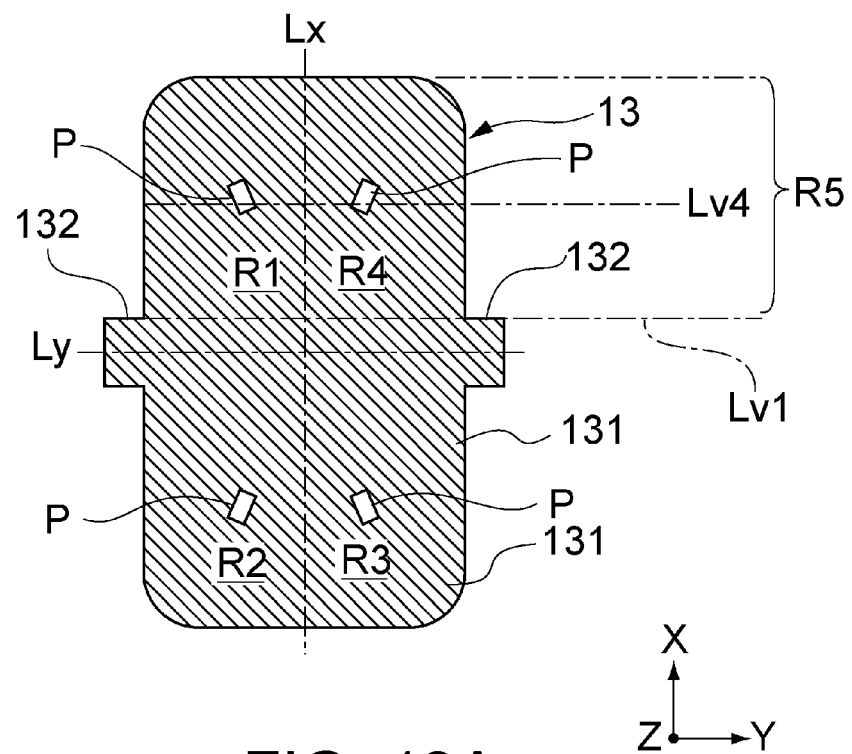
FIG. 12A is a plan view showing a second internal electrode according to a modification of the first embodiment.
Figure 12B:
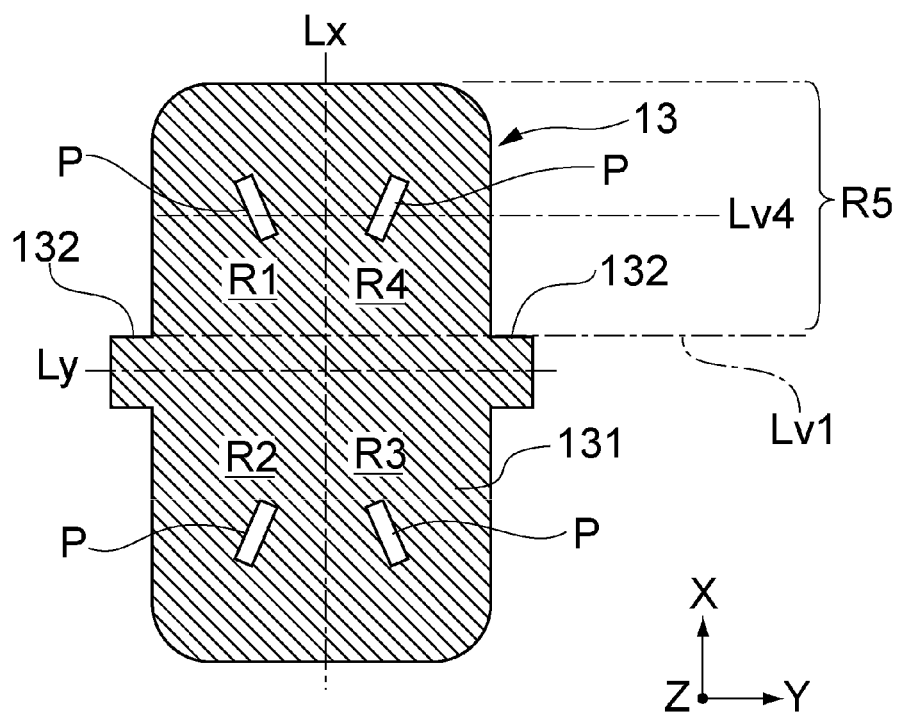
FIG. 12B is a plan view showing a second internal electrode according to another modification of the first embodiment.
Figure 12C:
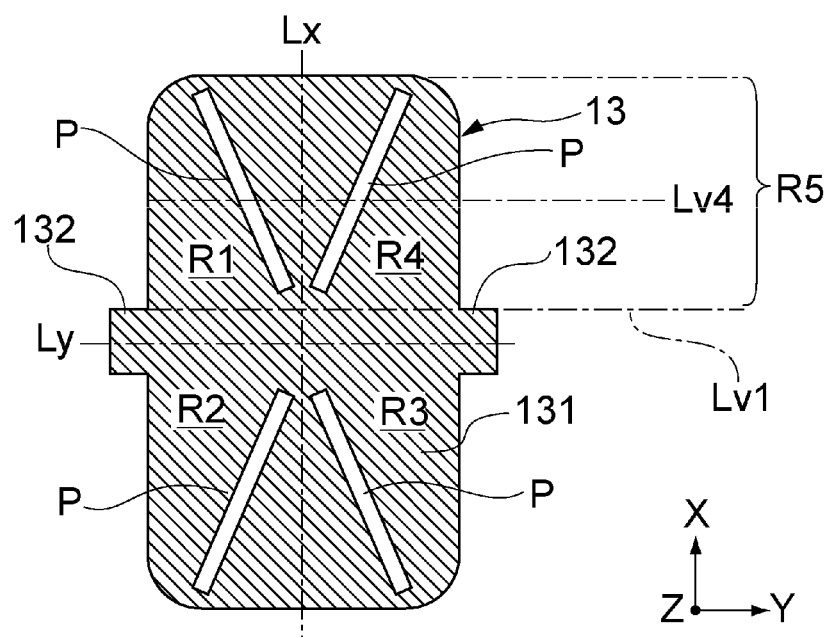
FIG. 12C is a plan view showing a second internal electrode according to another modification of the first embodiment.

As shown in FIGS. 12A to 12C, the present inventors used a model of a multilayer ceramic capacitor provided with internal electrodes 12 and 13 in which current regulation portions P of different lengths were formed, and performed simulations for measuring the ESL. Although FIGS. 12A to 12C show configuration examples of the second internal electrode 13, the first internal electrode 12 also has the current regulating portions P arranged in the same manner.

The current regulating portion P is arranged so as to cross the boundary line Lv4 described above. The electrode main bodies 121 and 131 have a length of about 1000 μm in the X-axis direction and a width of about 500 μm in the Y-axis direction.

In the example shown in FIG. 12A, the length in the longitudinal direction of the current regulating portion P is 50 μm, and the length in the X-axis direction is 45 μm. Further, the ratio of the length of the current regulating portion P in the X-axis direction to the length of the outer region R5 in the X-axis direction was about 10%.

In the example shown in FIG. 12B, the length in the longitudinal direction of the current regulating portion P is 100 μm, and the length in the X-axis direction is 90 μm. Also, the ratio of the length of the current regulating portion P in the X-axis direction to the length of the outer region R5 in the X-axis direction was approximately 18%.

In the example shown in FIG. 12C, the length in the longitudinal direction of the current regulating portion P is 350 μm, and the length in the X-axis direction is 310 μm. Also, the ratio of the length of the current regulating portion P in the X-axis direction to the length of the outer region R5 in the X-axis direction was about 63%.

The with of each of these current regulating portions P in the transverse direction orthogonal to the longitudinal direction (extending direction) was set to 35 μm.

A simulation was performed using a model of the circuit board 100 on which the multilayer ceramic capacitor 10 having such internal electrodes was mounted, and the ESL value was measured when the voltage was varied at a frequency of 1 GHz. The simulation results showed that the ESL value was 241 pH in the example of FIG. 12A, 233 pH in the example of FIG. 12B, and 238 pH in the example of FIG. 12C. In other words, as shown in FIG. 12B, it has been found that the ESL can be effectively reduced by appropriately lengthening the current regulating portion P and securing the distance from the outer edge portions E1 and E2.

From this result, the ESL can be further reduced by setting the ratio of the length of the current regulating portion P in the X-axis direction to the length of the outer region R5 in the X-axis direction to, for example, 15% or more and 70% or less.

Second Embodiment

In the first embodiment, each of the four current regulating portions extends obliquely with respect to the X-axis direction and the Y-axis direction. But the present invention is not limited to that configuration and the current regulating portions may extend parallel to the X-axis or Y-axis direction.

In each of the following embodiments, the same reference numerals are given to the same configurations as in the above-described embodiment, and detailed description thereof will be omitted.

Figure 13A:
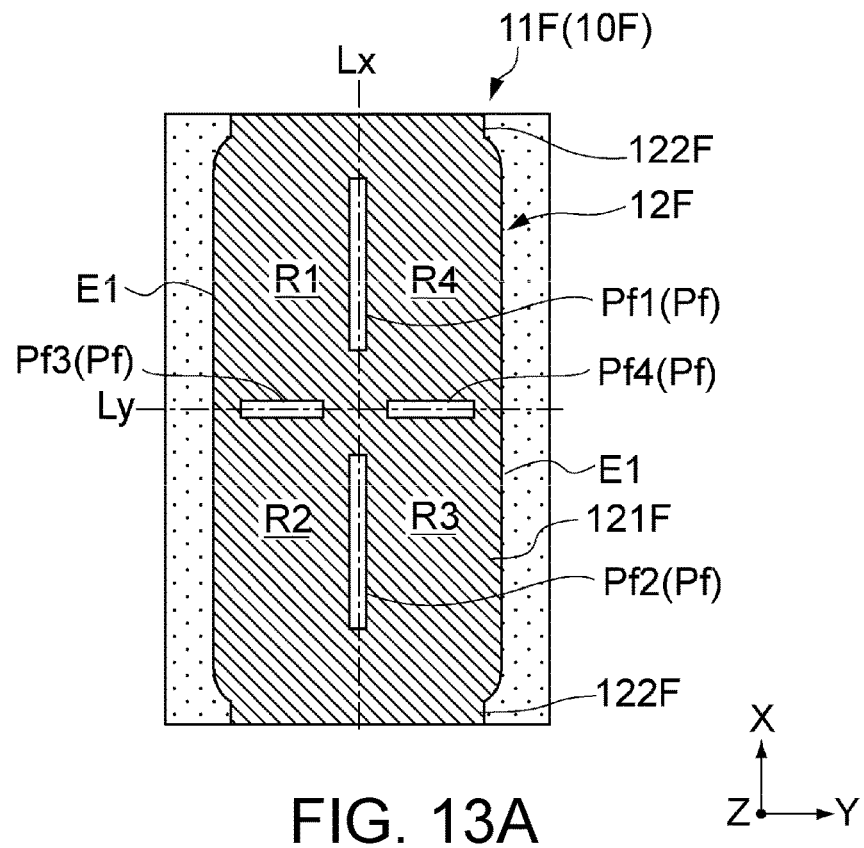
FIG. 13A is a cross-sectional view of a ceramic body of a multilayer ceramic capacitor according to a second embodiment of the present invention, showing a cross section cut parallel to the first axial direction and the second axial direction at the position of the first internal electrode.
Figure 13B:
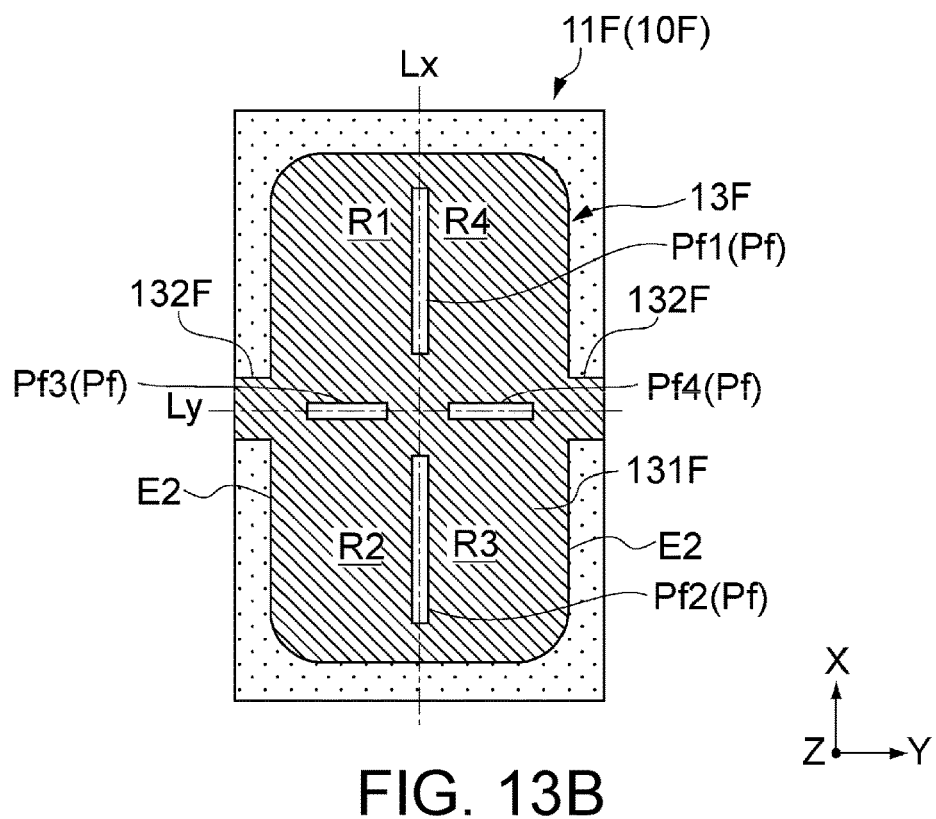
FIG. 13B is a cross-sectional view of the ceramic body of the second embodiment, showing a cross section cut parallel to the first axial direction and the second axial direction at the position of the second internal electrode.

FIGS. 13A and 13B are cross-sectional views of a multilayer ceramic capacitor 10F (ceramic body 11F) according to a second embodiment of the present invention. FIG. 13A shows a cross section cut parallel to the XY plane at the position of the first internal electrode 12F. FIG. 13B shows a cross section cut parallel to the XY plane at the position of the second internal electrode 13F.

The first internal electrode 12F includes a first electrode main body portion 121F having substantially the same outer shape as in the first embodiment, and a pair of first lead-out portions 122F.

Similarly, the second internal electrode 13F includes a second electrode main body portion 131F having substantially the same outer shape as in the first embodiment, and a pair of second lead-out portions 132F.

Furthermore, the electrode main bodies 121F and 131F each have a first current regulating portion Pf1, a second current regulating portion Pf2, a third current regulating portion Pf3 and a fourth current regulating portion Pf4, which are different from the first embodiment. In the following description, when there is no need to distinguish among the first current regulating portion Pf1, the second current regulating portion Pf2, the third current regulating portion Pf3, and the fourth current regulating portion Pf4, each of these will be referred to as "current regulating portion Pf".

The first current regulating portion Pf1 and the second current regulating portion Pf2 extend substantially parallel to the X-axis direction and are formed along the first center line Lx. The first current regulating portion Pf1 is formed across the first region R1 and the fourth region R4. The second current regulating portion Pf2 is formed across the second region R2 and the third region R3.

The third current regulating portion Pf3 and the fourth current regulating portion Pf4 extend substantially parallel to the Y-axis direction and are formed along the second center line Ly. The third current regulating portion Pf3 is formed across the first region R1 and the second region R2. The fourth current regulating portion Pf4 is formed across the third region R3 and the fourth region R4.

That is, in the above configuration, the first current regulating portion Pf1 and the second current regulating portion Pf2 are arranged line-symmetrically with respect to the second center line Ly, which is a straight line passing through the second lead-out portion 132F and parallel to the Y-axis direction. The third current regulating portion Pf3 and the fourth current regulating portion Pf4 are arranged line-symmetrically with respect to a first center line Lx, which is a straight line passing through the first lead-out portion 122F and parallel to the X-axis direction.

It should be noted that "extending substantially parallel" to a certain direction means extending in a direction that makes an angle of 10 degrees or less with that direction.

Also in this embodiment, each current regulating portion Pf is spaced apart from the outer edges E1, E2 and has a shape with an aspect ratio of more than one. As a result, the current in each of the regions R1 to R4 is guided toward the outer edges E1 and E2, avoiding the central portion in the X-axis direction and the central portion in the Y-axis direction. Specifically, it is possible to regulate a current that would otherwise flow obliquely across the center lines Lx and Ly. Therefore, it is possible to further increase the current density near the outer edges E1 and E2 and reduce the ESL.

Third Embodiment

In the first and second embodiments described above, the four current regulating portions are separated at the central portion in the X-axis direction and the Y-axis direction. These regulating portions may cross in the said center part.

Figure 14A:
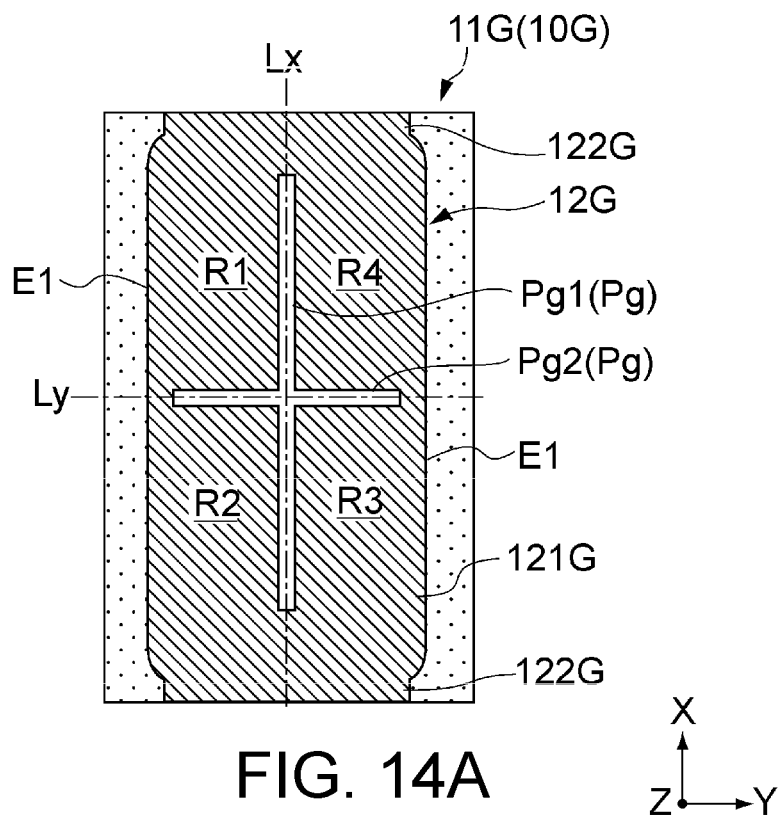
FIG. 14A is a cross-sectional view of a ceramic body of a multilayer ceramic capacitor according to a third embodiment of the present invention, showing a cross section cut parallel to the first axial direction and the second axial direction at the position of the first internal electrode.
Figure 14B:
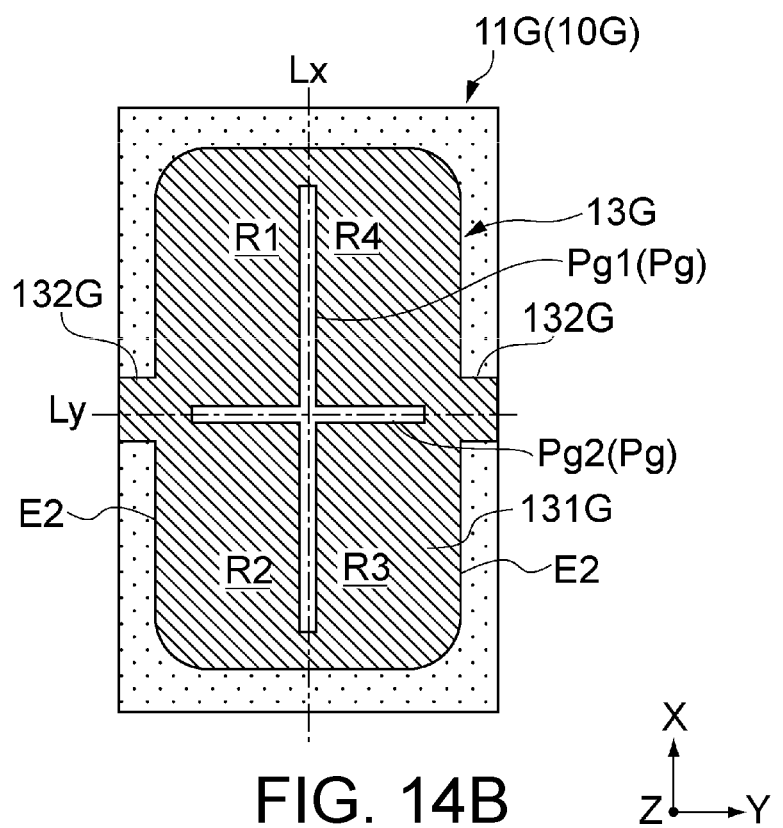
FIG. 14B is a cross-sectional view of the ceramic body of the third embodiment, showing a cross section cut parallel to the first axial direction and the second axial direction at the position of the second internal electrode.

FIGS. 14A and 14B are cross-sectional views of a multilayer ceramic capacitor 10G (ceramic body 11G) according to a third embodiment of the present invention. FIG. 14A shows a cross section cut parallel to the XY plane at the position of the first internal electrode 12G. FIG. 14B shows a cross section cut parallel to the XY plane at the position of the second internal electrode 13G.

The first internal electrode 12G includes a first electrode main body portion 121G and a pair of first lead-out portions 122G similar to those in the second embodiment.

Similarly, the second internal electrode 13G includes a second electrode main body portion 131G and a pair of second lead-out portions 132G similar to those in the second embodiment.

Furthermore, the electrode main bodies 121G and 131G each have a first current regulating portion Pg1 and a second current regulating portion Pg2, which are different from the above embodiments. In the following description, when there is no need to distinguish between the first current regulating portion Pg1 and the second current regulating portion Pg2, each of these will also be referred to as the "current regulating portion Pg."

The first current regulating portion Pg1 extends substantially parallel to the X-axis direction and is formed along the first center line Lx. The first current regulating portion Pg1 is formed across the regions R1 to R4.

The second current regulating portion Pg2 extends substantially parallel to the Y-axis direction and is formed along the second center line Ly. The second current regulating portion Pg2 is formed across the regions R1 to R4.

These current regulating portions Pg1 and Pg2 intersect each other at the central portion in the X-axis direction and the Y-axis direction.

Also in this embodiment, each current regulating portion Pg is spaced apart from the outer edges E1 and E2 and has a shape with an aspect ratio of more than one. As a result, the current in each of the regions R1 to R4 is guided toward the outer edges E1 and E2, avoiding the central portion in the X-axis direction and the central portion in the Y-axis direction. Therefore, it is possible to further increase the current density near the outer edges E1 and E2 and reduce the ESL.

[Modification]

The first current regulating portion P1 and the second current regulating portion P2 may extend obliquely with respect to the X-axis direction and the Y-axis direction. Even with such a configuration, it is possible to obtain the same effects as those of the multilayer ceramic capacitor 10 according to the third embodiment.

Fourth Embodiment

Furthermore, the electrode main body is not limited to having a plurality of current regulating portions, and may have one current regulating portion.

Figure 15A:
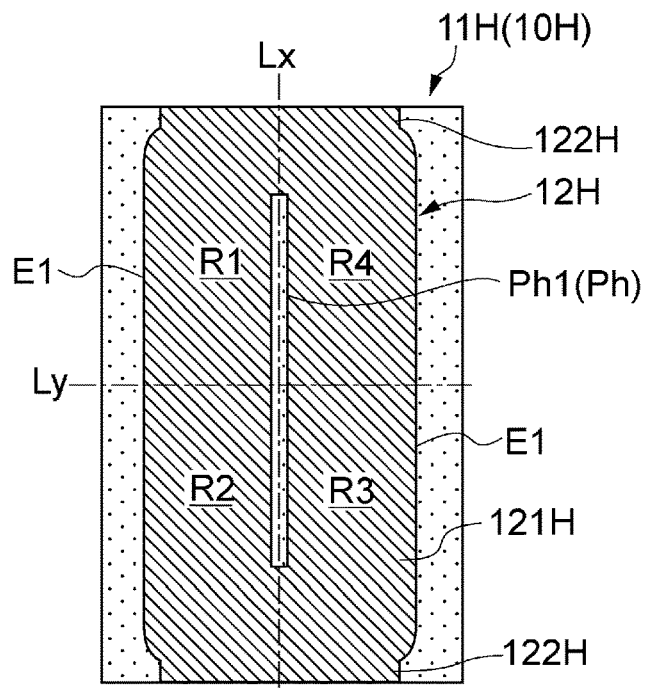
FIG. 15A is a cross-sectional view of a ceramic body of a multilayer ceramic capacitor according to a fourth embodiment of the present invention, showing a cross section cut parallel to the first axial direction and the second axial direction at the position of the first internal electrode.
Figure 15B:
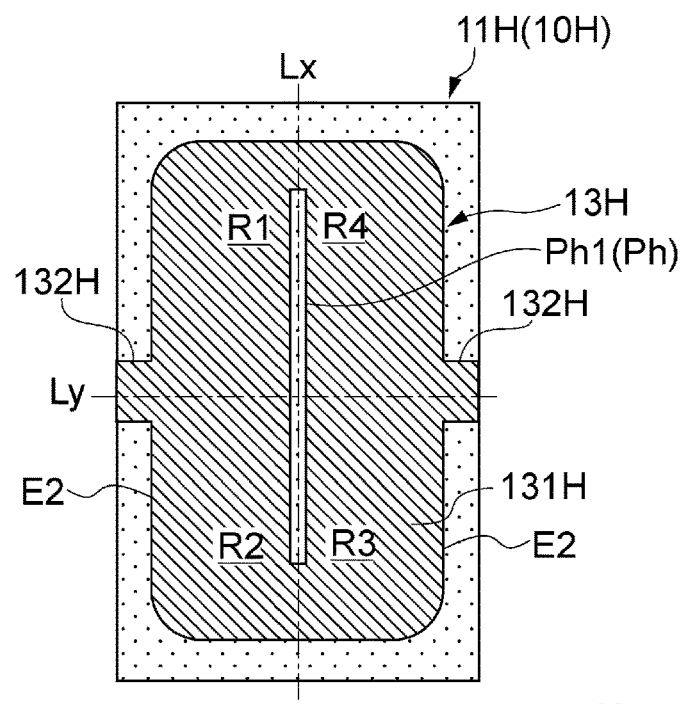
FIG. 15B is a cross-sectional view of the ceramic body of the fourth embodiment, showing a cross section cut parallel to the first axial direction and the second axial direction at the position of the second internal electrode.

FIGS. 15A and 15B are cross-sectional views of a multilayer ceramic capacitor 10H (ceramic body 11H) according to a fourth embodiment of the present invention. FIG. 15A shows a cross section cut parallel to the XY plane at the position of the first internal electrode 12H. FIG. 15B shows a cross section cut parallel to the XY plane at the position of the second internal electrode 13H.

The first internal electrode 12H includes a first electrode main body portion 121H and a pair of first lead-out portions 122H similar to those in the second embodiment.

Similarly, the second internal electrode 13H includes a second electrode main body portion 131H and a pair of second lead-out portions 132H similar to those of the second embodiment.

Further, each of the electrode main bodies 121H and 131H has a first current regulating portion Ph1 (current regulating portion Ph) that is different from the above embodiments. The current regulating portion Ph extends substantially parallel to the X-axis direction and is formed from the first end surface 11a side to the second end surface 11b side along the first center line Lx. The current regulating portion Ph is formed across the regions R1 to R4.

Also in this embodiment, the current regulating portion Ph is spaced apart from the outer edges E1 and E2 and has a shape with an aspect ratio of more than one. This makes it easier for the current to be guided toward the outer edges E1 and E2, avoiding the central portion in the Y-axis direction. Specifically, it is possible to regulate a current that flows obliquely across the first center line Lx. Therefore, it is possible to further increase the current density near the outer edges E1 and E2 and reduce the ESL.

[Modification 1]

Figure 16A:
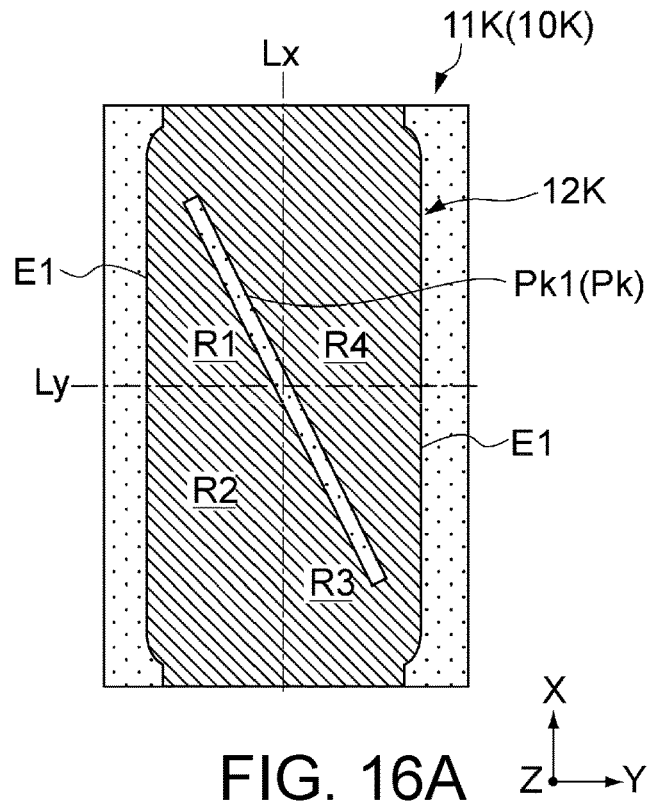
FIG. 16A is a cross-sectional view of a ceramic body of a multilayer ceramic capacitor according to Modification 1 of the above embodiments, showing a cross section cut parallel to the first axial direction and the second axial direction at the position of the first internal electrode.
Figure 16B:
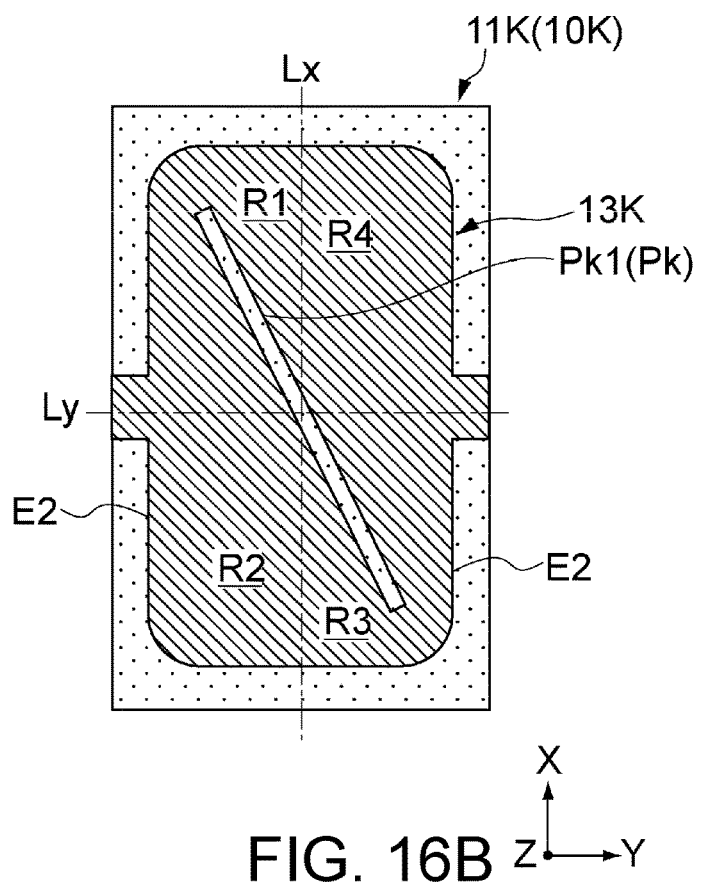
FIG. 16B is a cross-sectional view of the ceramic body of Modification 1, showing a cross section cut parallel to the first axial direction and the second axial direction at the position of the second internal electrode.

FIGS. 16A and 16B are cross-sectional views of a multilayer ceramic capacitor 10K (ceramic body 11K) according to Modification 1 of the present embodiment. FIG. 16A shows a cross section cut parallel to the XY plane at the position of the first internal electrode 12K. FIG. 16B shows a cross section cut parallel to the XY plane at the position of the second internal electrode 13K.

As shown in these figures, the first current regulating portion Pk1 (current regulating portion Pk) extends obliquely with respect to the X-axis direction and the Y-axis direction, for example, from the first region R1 toward the third region R3. Even with such a configuration, in particular in the first region R1 and the third region R3, the effect of guiding the current toward the outer edges E1 and E2 can be exhibited, and the ESL can be reduced.

[Modification 2]

Figure 17A:
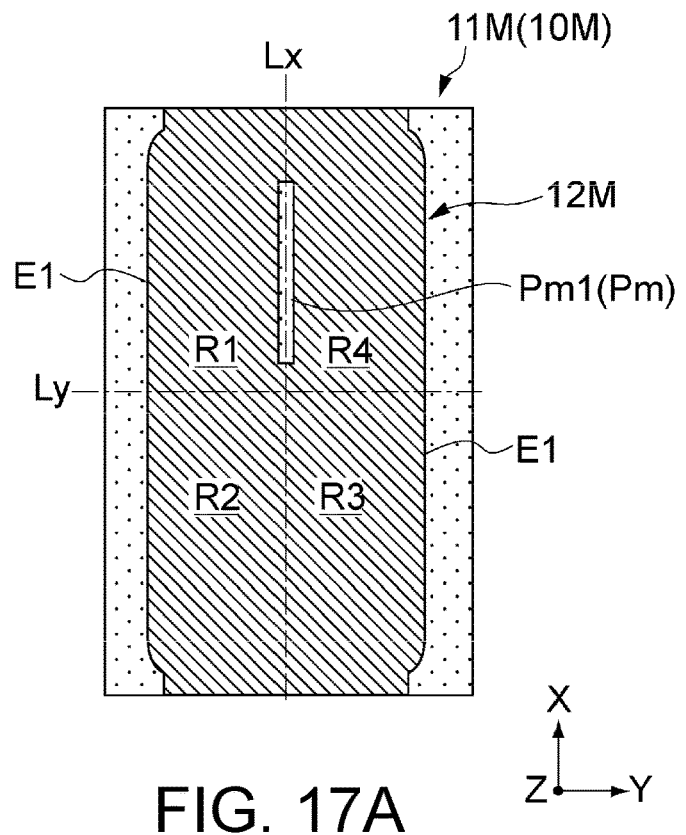
FIG. 17A is a cross-sectional view of a ceramic body of a multilayer ceramic capacitor according to Modification 2 of the above embodiments, showing a cross section cut parallel to the first axial direction and the second axial direction at the position of the first internal electrode.
Figure 17B:
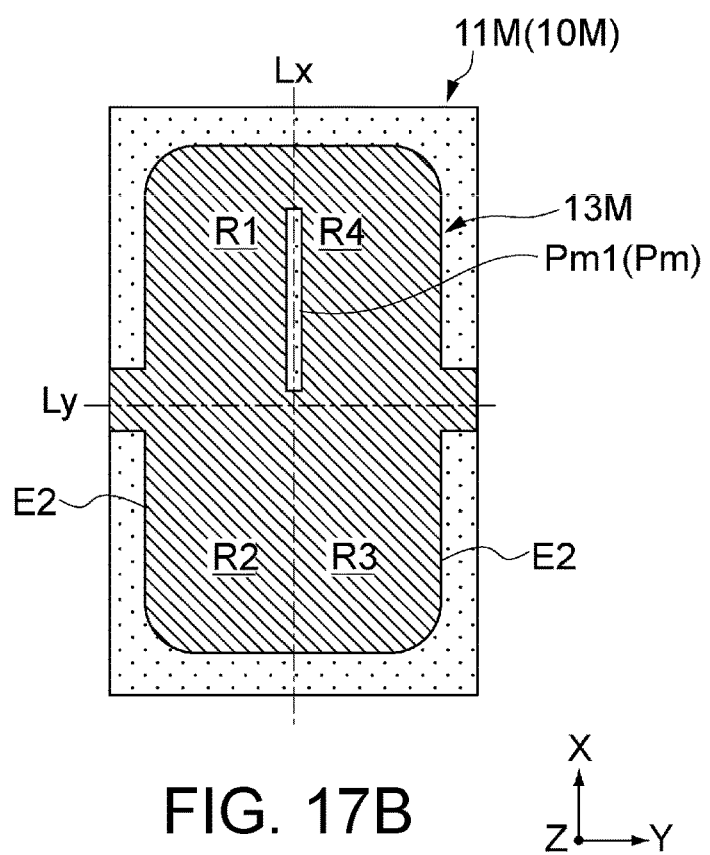
FIG. 17B is a cross-sectional view of the ceramic body of Modification 2, showing a cross section cut parallel to the first axial direction and the second axial direction at the position of the second internal electrode.

FIGS. 17A and 17B are cross-sectional views of a multilayer ceramic capacitor 10M (ceramic body 11M) according to Modification 2 of the present embodiment. FIG. 17A shows a cross section cut parallel to the XY plane at the position of the first internal electrode 12M. FIG. 17B shows a cross section cut parallel to the XY plane at the position of the second internal electrode 13M.

As shown in these figures, the first current regulating portion Pm1 (current regulating portion Pm) extends substantially parallel to the X-axis direction along the center line Lx, and are placed only in the first and fourth regions R1 and R4. Even with such a configuration, in the first and fourth regions R1 and R4, the effect of guiding the current toward the outer edges E1 and E2 can be exhibited, and the ESL can be reduced.

[Modification 3]

Figure 18A:
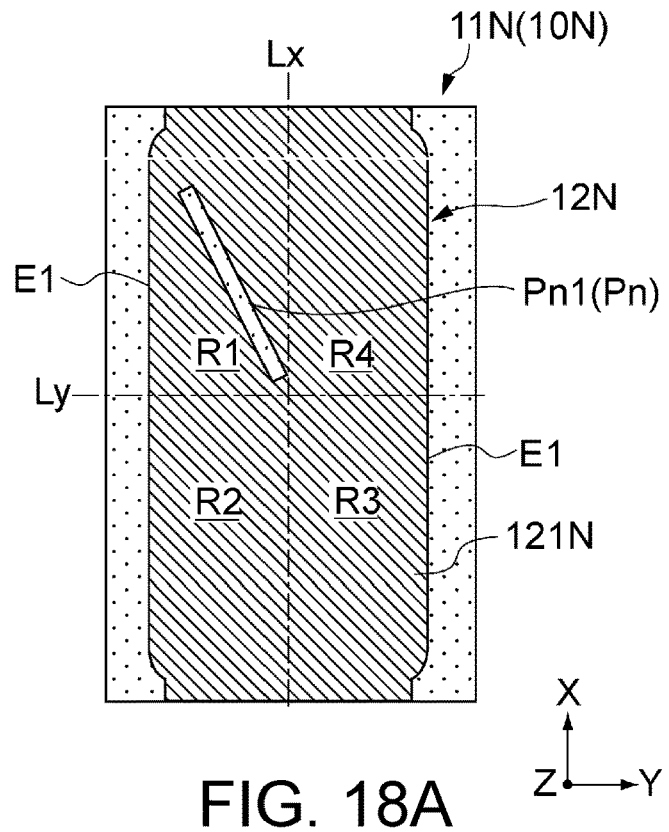
FIG. 18A is a cross-sectional view of a ceramic body of a multilayer ceramic capacitor according to Modification 3 of the above embodiments, showing a cross section cut parallel to the first axial direction and the second axial direction at the position of the first internal electrode.
Figure 18B:
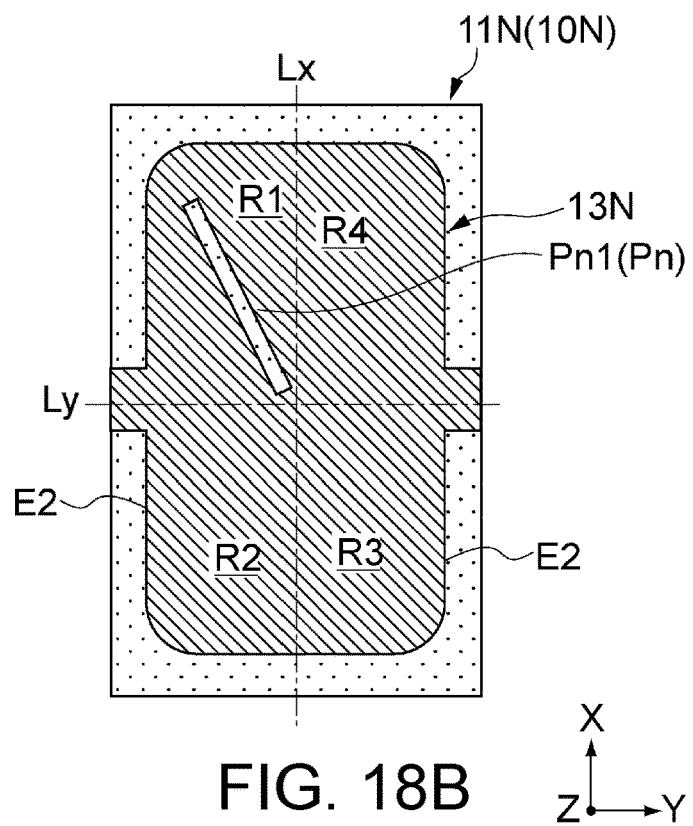
FIG. 18B is a cross-sectional view of the ceramic body of Modification 3, showing a cross section cut parallel to the first axial direction and the second axial direction at the position of the second internal electrode.

FIGS. 18A and 18B are cross-sectional views of a multilayer ceramic capacitor 10N according to Modification 3 of the present embodiment. FIG. 18A shows a cross section cut parallel to the XY plane at the position of the first internal electrode 12N. FIG. 18B shows a cross section cut parallel to the XY plane at the position of the second internal electrode 13N.

As shown in these figures, the first current regulating portion Pn1 (current regulating portion Pn) extends obliquely with respect to the X-axis direction and the Y-axis direction, and is arranged only in the first region R1. Even with such a configuration, in the first region R1, the effect of guiding the current toward the outer edges E1 and E2 can be exhibited, and the ESL can be reduced.

Fifth Embodiment

In the above embodiment, an aspect having a current regulating portion extending at least in the X-axis direction has been described, but the present invention is not limited to this.

Figure 19A:
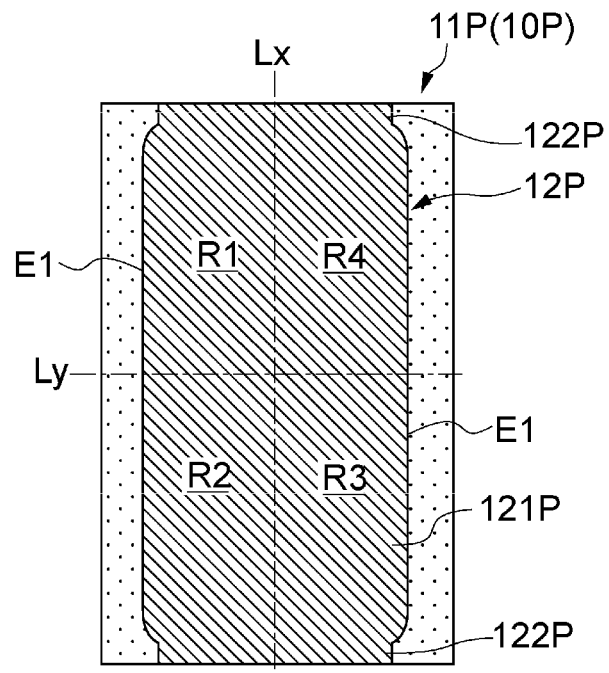
FIG. 19A is a cross-sectional view of a ceramic body of a multilayer ceramic capacitor according to a fifth embodiment of the present invention, showing a cross section cut parallel to the first axial direction and the second axial direction at the position of the first internal electrode.
Figure 19B:
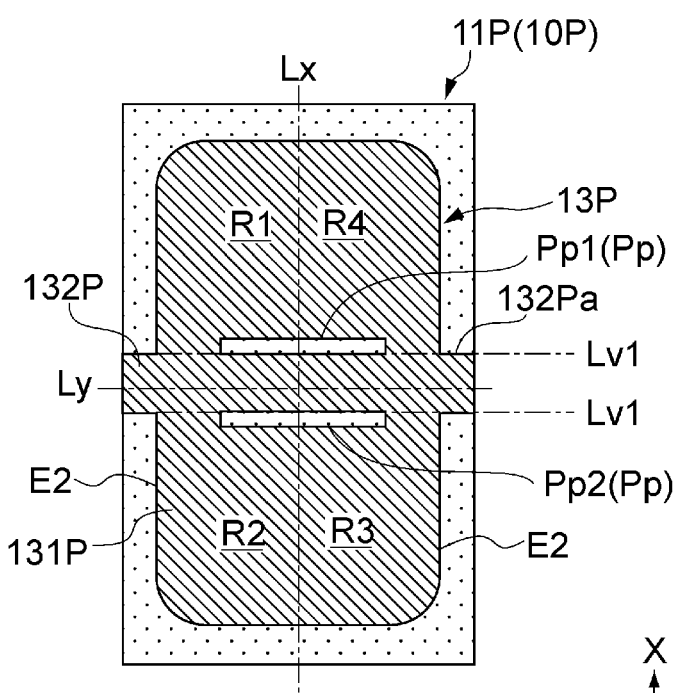
FIG. 19B is a cross-sectional view of the ceramic body of the fifth embodiment, showing a cross section cut parallel to the first axial direction and the second axial direction at the position of the second internal electrode.

FIGS. 19A and 19B are cross-sectional views of a multilayer ceramic capacitor 10P (ceramic body 11P) according to a fifth embodiment of the present invention. FIG. 19A shows a cross section cut parallel to the XY plane at the position of the first internal electrode 12P. FIG. 19B shows a cross section cut parallel to the XY plane at the position of the second internal electrode 13P.

The first internal electrode 12P includes a first electrode main body portion 121P having the same outer shape as in the first embodiment, and a pair of first lead-out portions 122P.

Similarly, the second internal electrode 13P includes a second electrode main body portion 131P having the same outer shape as in the first embodiment, and a pair of second lead-out portions 132P.

Furthermore, as shown in FIG. 19B, the second electrode main body portion 131P has a first current regulating portion Pp1 and a second current regulating portion Pp2, which are different from those in the above embodiments. In the following description, when there is no need to distinguish between the first current regulating portion Pp1 and the second current regulating portion Pp2, each of these will also be referred to as the "current regulating portion Pp."

The first current regulating portion Pp1 and the second current regulating portion Pp2 each extend substantially parallel to the Y-axis direction and are arranged with the second center line Ly interposed therebetween. In the example shown in FIG. 19B, these current regulating portions Pp are arranged on first imaginary lines Lv1 extending parallel to the Y-axis direction from the side edge portions 132Pa of the second lead-out portion 132P.

Also in this embodiment, each current regulating portion Pp is spaced apart from the outer edges E1 and E2 and has a shape with an aspect ratio of more than one. As a result, a current can be guided between the end of the current regulating portion Pp and the outer edges E1 and E2, the current density in the vicinity of the outer edges E1 and E2 can be increased, and the ESL can be reduced.

The length along the longitudinal direction of the current regulating portion Pp is not particularly limited, and can be, for example, 20% or more and 80% or less of the length of the second electrode main body portion 131P in the Y-axis direction.

The width of the current regulating portion Pp perpendicular to the longitudinal direction is also, for example, 1 μm or more and 100 μm or less, for example, 5 μm or more and 50 μm or less, as in the first embodiment.

Also, the current regulating portion Pp may be arranged on either the first internal electrode 12P or the second internal electrode 13P. In the example shown in FIGS. 19A and 19B, the current regulating portion Pp is arranged only on the second internal electrode 13P. As a result, the current density in the vicinity of the outer edge portions E1 and E2 can be increased in the inner electrode on which the current regulating portion Pp is arranged. In addition, the current density distribution of the internal electrode on which the current regulating portion Pp is arranged also affects the opposing internal electrodes. Therefore, even in such a configuration, the ESL of the multilayer ceramic capacitor 10P can be lowered.

OTHER EMBODIMENTS

Although each embodiment of the present invention has been described above, the present invention is not limited to the above-described embodiments, and it goes without saying that various modifications can be made without departing from the gist of the present invention. For example, embodiments of the present invention can be embodiments in which each embodiment is combined.

The current regulating portions are not limited to being provided on all the first internal electrodes and/or all the second internal electrodes, but may be provided on some of the first internal electrodes and/or some of the second internal electrodes.

In the above embodiments, the first center line Lx is an example of "a straight line passing through the first lead-out portion and parallel to the X-axis direction", and the second center line Lx is an example of "a straight line passing through the second lead-out portion and parallel to the Y-axis direction". Although the centerline Ly is mentioned, the axis of symmetry is not limited to the centerlines Lx and Ly.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A multilayer ceramic capacitor, comprising:
 a ceramic body having a pair of end surfaces perpendicular to a first axis and a pair of side surfaces perpendicular to a second axis that is orthogonal to the first axis, the ceramic body including:
 a first internal electrode having a first electrode main body portion and a pair of first lead-out portions led out from the first electrode main body portion to the pair of end surfaces, respectively; and a second internal electrode having a second electrode main body portion and a pair of second lead-out portions led out from the second electrode main body portion to the pair of side surfaces, respectively, the second internal electrode facing the first internal electrode in a direction of a third axis that is orthogonal to the first and second axes;

a pair of first external electrodes arranged on the pair of end surfaces, respectively, and connected to the pair of first lead-out portions of the first internal electrode; and a pair of second external electrodes arranged on the pair of side surfaces, respectively, and connected to the pair of second lead-out portions of the second internal electrode, wherein each of the first electrode main body portion of the first internal electrode and the second electrode main body portion of the second internal electrode has a first current regulating portion that is a cutout portion spaced apart from an outer edge of the corresponding first or second electrode main body portion and having a shape in which a ratio of a maximum longitudinal dimension to a maximum transverse dimension is greater than 1, wherein the first internal electrode is physically continuous between the first external electrodes, and the second internal electrode is physically continuous between the second external electrodes.

2. The multilayer ceramic capacitor according to claim 1, wherein the first current regulating portion has a dimension along the first axis greater than a dimension along the second axis thereof.

3. The multilayer ceramic capacitor according to claim 2, wherein the first current regulating portion is formed obliquely with respect to the first axis and the second axis.

4. The multilayer ceramic capacitor according to claim 2, wherein the first current regulating portion is positioned so as to cross a virtual boundary line extending along the second axis in a plan view as seen in a direction of the third axis, the virtual boundary line dividing an outer region of the first electrode main body portion into equal halves in the plan view, the outer region being defined as a region in the first electrode main body portion that is located, in the plan view, on an outer side of a virtual line that is extending along the second axis from a side edge, along the first axis, of the second lead-out portion of the second internal electrode.

5. The multilayer ceramic capacitor according to claim 1, wherein the first current regulating portion is provided in one of quadrants of at least one of the first electrode main body portion of the first internal electrode and the second electrode main body portion of the second internal electrode, the quadrants being defined as four regions of the corresponding first or second electrode main body portion divided by a first center line extending in a direction of the first axis dividing the corresponding first or second electrode main body portion into equal halves and by a second center line extending in a direction of the second axis dividing the corresponding first or second electrode main body portion into equal halves.

6. The multilayer ceramic capacitor according to claim 1, wherein the first current regulating portion is formed so as to cross at least two of quadrants of at least one of the first electrode main body portion of the first internal electrode and the second electrode main body portion of the second internal electrode, the quadrants being defined as four regions of the corresponding first or second electrode main body portion divided by a first center line extending in a direction of the first axis dividing the corresponding first or second electrode main body portion into equal halves and by a second center line extending in a direction of the second axis dividing the corresponding first or second electrode main body portion into equal halves.

7. The multilayer ceramic capacitor according to claim 6, wherein the first current regulating portion is formed along the first or second center line in a plan view.

8. The multilayer ceramic capacitor according to claim 1, wherein at least one of the first electrode main body portion of the first internal electrode and the second electrode main body portion of the second internal electrode further has a second current regulating portion that is a cutout portion spaced apart from an outer edge of the corresponding first or second electrode main body portion and having a shape in which a ratio of a maximum longitudinal dimension to a maximum transverse dimension is greater than 1.

9. The multilayer ceramic capacitor according to claim 8, wherein the first current regulating portion is provided in one of quadrants of at least one of the first electrode main body portion of the first internal electrode and the second electrode main body portion of the second internal electrode, and the second current regulating portion is provided in another of the quadrants, the quadrants being defined as four regions of the corresponding first or second electrode main body portion divided by a first center line extending in a direction of the first axis dividing the corresponding first or second electrode main body portion into equal halves and by a second center line extending in a direction of the second axis dividing the corresponding first or second electrode main body portion into equal halves.

10. The multilayer ceramic capacitor according to claim 8, wherein the first current regulating portion and the second current regulating portion are formed line-symmetrically with respect to a virtual straight line extending in a direction of the first axis and passing through the first lead-out portion or a virtual straight line extending in a direction of the second axis and passing through the second lead-out portion in a plan view.

11. The multilayer ceramic capacitor according to claim 8, wherein the first current regulating portion and the second current regulating portion intersect with each other.

12. The multilayer ceramic capacitor according to claim 8, wherein said at least one of the first electrode main body portion of the first internal electrode and the second electrode main body portion of the second internal electrode further has a third current regulating portion and a fourth current regulating portion, each of the third and fourth current regulating portions being a cutout portion spaced apart from an outer edge of the corresponding first or second electrode main body portion and having a shape in which a ratio of a maximum longitudinal dimension to a maximum transverse dimension is greater than 1.

13. The multilayer ceramic capacitor according to claim 12, wherein the first current regulating portion is provided in a first quadrant among quadrants of the at least one of the first electrode main body portion of the first internal electrode and the second electrode main body portion of the second internal electrode, the second current regulating portion is provided in a second quadrant among the quadrants, the third current regulating portion is provided in a third quadrant among the quadrants, and the fourth current regulating portion is provided in a fourth quadrant among the quadrants, the quadrants being defined as four regions of the corresponding first or second electrode main body portion divided by a first center line extending in a direction of the first axis dividing the corresponding first or second electrode main body portion into equal halves and by a second center line extending in a direction of the second axis dividing the corresponding first or second electrode main body portion into equal halves.

14. The multilayer ceramic capacitor according to claim 13, wherein the third current regulating portion and the fourth current regulating portion are formed line-symmetrically with respect to a virtual straight line extending in a direction of the first axis and passing through the first lead-out portion or a virtual straight line extending in a direction of the second axis and passing through the second lead-out portion in a plan view.

15. The multilayer ceramic capacitor according to claim 13, wherein the first current regulating portion and the second current regulating portion are formed line-symmetrically with respect to one of the first center line and the second center line, and the third current regulating portion and the fourth current regulating portion are formed line-symmetrically with respect to said one of the first center line and the second center line.

16. The multilayer ceramic capacitor according to claim 12, wherein the first, second, third, and the fourth current regulating portions are formed so as to radially extend respectively from an inner side to an outer side along directions of the first and second axes.

17. A circuit board, comprising:
a multilayer ceramic capacitor; and
a substrate body mounting the multilayer ceramic capacitor thereon,
wherein the multilayer ceramic capacitor includes:
a ceramic body having a pair of end surfaces perpendicular to a first axis and a pair of side surfaces perpendicular to a second axis that is orthogonal to the first axis, the ceramic body including:
a first internal electrode having a first electrode main body portion and a pair of first lead-out portions led out from the first electrode main body portion to the pair of end surfaces, respectively; and
a second internal electrode having a second electrode main body portion and a pair of second lead-out portions led out from the second electrode main body portion to the pair of side surfaces, respectively, the second internal electrode facing the first internal electrode in a direction of a third axis that is orthogonal to the first and second axes;
a pair of first external electrodes arranged on the pair of end surfaces, respectively, and connected to the pair of first lead-out portions of the first internal electrode; and
a pair of second external electrodes arranged on the pair of side surfaces, respectively, and connected to the pair of second lead-out portions of the second internal electrode,
wherein each of the first electrode main body portion of the first internal electrode and the second electrode main body portion of the second internal electrode has a first current regulating portion that is a cutout portion spaced apart from an outer edge of the corresponding first or second electrode main body portion and having a shape in which a ratio of a maximum longitudinal dimension to a maximum transverse dimension is greater than 1,
wherein the first internal electrode is physically continuous between the first external electrodes, and the second internal electrode is physically continuous between the second external electrodes.

18. A multilayer ceramic capacitor, comprising:
a ceramic body having a pair of end surfaces perpendicular to a first axis and a pair of side surfaces perpendicular to a second axis that is orthogonal to the first axis, the ceramic body including:
a first internal electrode having a first electrode main body portion and a pair of first lead-out portions led out from the first electrode main body portion to the pair of end surfaces, respectively; and
a second internal electrode having a second electrode main body portion and a pair of second lead-out portions led out from the second electrode main body portion to the pair of side surfaces, respectively, the second internal electrode facing the first internal electrode in a direction of a third axis that is orthogonal to the first and second axes;
a pair of first external electrodes arranged on the pair of end surfaces, respectively, and connected to the pair of first lead-out portions of the first internal electrode; and
a pair of second external electrodes arranged on the pair of side surfaces, respectively, and connected to the pair of second lead-out portions of the second internal electrode,
wherein at least one of the first electrode main body portion of the first internal electrode and the second electrode main body portion of the second internal electrode has a first current regulating portion that is a cutout portion spaced apart from an outer edge of the corresponding first or second electrode main body portion and having a shape in which a ratio of a maximum longitudinal dimension to a maximum transverse dimension is greater than 1,
wherein an entire periphery of the cutout portion is surrounded by the corresponding first or second electrode main body portion without a break,
wherein the first current regulating portion has a dimension along the first axis greater than a dimension along the second axis thereof, and
wherein the first current regulating portion is formed obliquely with respect to the first axis and the second axis.

19. The multilayer ceramic capacitor according to claim 18, wherein the first electrode main body portion and the second electrode main body portion have substantially a rectangle shape in a plan view as seen in direction of a third axis that is orthogonal to the first axis and the second axis, and the cut-out portion extends along a diagonal of the rectangle shape.

* * * * *